US008955561B2

(12) United States Patent
Mitrovich et al.

(10) Patent No.: US 8,955,561 B2
(45) Date of Patent: Feb. 17, 2015

(54) REFILLING APPARATUS WITH JET LEVEL SENSOR

(71) Applicant: SpillX LLC, Kenmore, WA (US)

(72) Inventors: Michael J. Mitrovich, Kenmore, WA (US); Matt Molz, Wamego, KS (US); Matt Campbell, Manhattan, KS (US)

(73) Assignee: SpillX LLC, Kenmore, WA (US)

( * ) Notice: Subject to any disclaimer, the term of this patent is extended or adjusted under 35 U.S.C. 154(b) by 308 days.

(21) Appl. No.: 13/644,713

(22) Filed: Oct. 4, 2012

(65) Prior Publication Data

US 2013/0098500 A1 Apr. 25, 2013

Related U.S. Application Data

(60) Provisional application No. 61/543,799, filed on Oct. 5, 2011, provisional application No. 61/691,668, filed on Aug. 21, 2012, provisional application No. 61/543,129, filed on Oct. 4, 2011.

(51) Int. Cl.
| *B65B 3/26* | (2006.01) |
| *G01F 23/14* | (2006.01) |
| *B65B 3/04* | (2006.01) |
| *B67D 7/36* | (2010.01) |
| *G05D 9/12* | (2006.01) |

(52) U.S. Cl.
CPC . *G01F 23/14* (2013.01); *B65B 3/04* (2013.01); *B67D 7/362* (2013.01); *G05D 9/12* (2013.01)
USPC ............................. 141/95; 141/198; 141/205

(58) Field of Classification Search
USPC ............................. 141/94–95, 192, 198, 205
See application file for complete search history.

(56) References Cited

U.S. PATENT DOCUMENTS

| 2,896,840 | A | | 7/1959 | Hendry | |
| 3,020,924 | A | | 2/1962 | Davies | |
| 3,047,009 | A | * | 7/1962 | Hunter | ........................ 137/403 |
| 3,055,405 | A | | 9/1962 | Pase | |
| 3,156,271 | A | | 11/1964 | Schnurmann | |
| 3,168,105 | A | | 2/1965 | Cisco et al. | |
| 3,269,404 | A | | 8/1966 | Lebow | |
| 3,406,709 | A | * | 10/1968 | Elbogen et al. | ............... 137/389 |
| 3,485,262 | A | | 12/1969 | Perren | |
| 3,561,465 | A | | 2/1971 | de Graaf | |
| 3,587,622 | A | | 6/1971 | Hardison | |
| 3,610,571 | A | * | 10/1971 | Cisco | ........................... 251/63.6 |

(Continued)

FOREIGN PATENT DOCUMENTS

| EP | 0144549 A1 | 6/1985 |
| GB | 1153381 | 5/1969 |

(Continued)

OTHER PUBLICATIONS

International Search Report and Written Opinion, PCT/US12/058752, dated Feb. 28, 2013.

(Continued)

*Primary Examiner* — Nicolas A Arnett
(74) *Attorney, Agent, or Firm* — Buchanan Nipper

(57) ABSTRACT

A refilling system for use in refilling a container with a fluid from a fluid source. The container having an air space above a fluid space. The fluid having a fluid level within the container. The refilling system comprising: a pilot-operated fluid flow control valve fluidly connected with a fluid level sensor via a pressure line and a bleed line.

20 Claims, 13 Drawing Sheets

(56) References Cited

U.S. PATENT DOCUMENTS

| | | |
|---|---|---|
| 3,662,793 A | 5/1972 | Calisher |
| 3,703,907 A | 11/1972 | Richards |
| 3,892,254 A | 7/1975 | Hilgert |
| 3,896,840 A | 7/1975 | Andersson |
| 3,335,746 A | 8/1976 | Lebow |
| 4,006,762 A | 2/1977 | Badger |
| 4,024,887 A | 5/1977 | McGregor |
| 4,075,912 A | 2/1978 | Schaefer |
| 4,161,188 A | 7/1979 | Jorgensen |
| 4,211,249 A | 7/1980 | Richards |
| 4,292,996 A | 10/1981 | Pataki et al. |
| 4,312,373 A | 1/1982 | Tilling |
| 4,484,601 A | 11/1984 | Campau |
| 4,515,178 A | 5/1985 | Campau |
| 4,527,593 A | 7/1985 | Campau |
| 5,279,121 A | 1/1994 | Barber |
| 5,285,812 A | 2/1994 | Morales |
| 6,078,850 A | 6/2000 | Kane |
| 6,082,392 A | 7/2000 | Watkins, Jr. |
| 6,318,406 B1 | 11/2001 | Conley |
| 6,837,262 B2 | 1/2005 | Cortez |
| 6,837,263 B2 | 1/2005 | Kramer |
| 7,258,130 B2 | 8/2007 | Cortez |
| 7,757,709 B2 | 7/2010 | Cortez |
| 8,550,128 B2 * | 10/2013 | Mitrovich ............ 141/198 |
| 2005/0166993 A1 | 8/2005 | Viken et al. |
| 2013/0032248 A1 * | 2/2013 | Mitrovich ............ 141/198 |
| 2014/0261884 A1 * | 9/2014 | Quang ............ 141/196 |

FOREIGN PATENT DOCUMENTS

| | | |
|---|---|---|
| GB | 2317382 A | 3/1998 |
| RU | 2200302 C2 | 3/2003 |
| SU | 492859 A1 | 11/1975 |
| SU | 594044 A1 | 2/1978 |
| SU | 1188706 A1 | 10/1985 |
| SU | 1264145 A1 | 10/1986 |
| SU | 1798986 A1 | 5/1996 |

OTHER PUBLICATIONS

Meggitt Fuelling Products, Jet Level Sensor Overfill Protection F613, pamphlet.

International Search Report and Written Opinion, PCT/US2012/058783, dated Mar. 21, 2013.

* cited by examiner

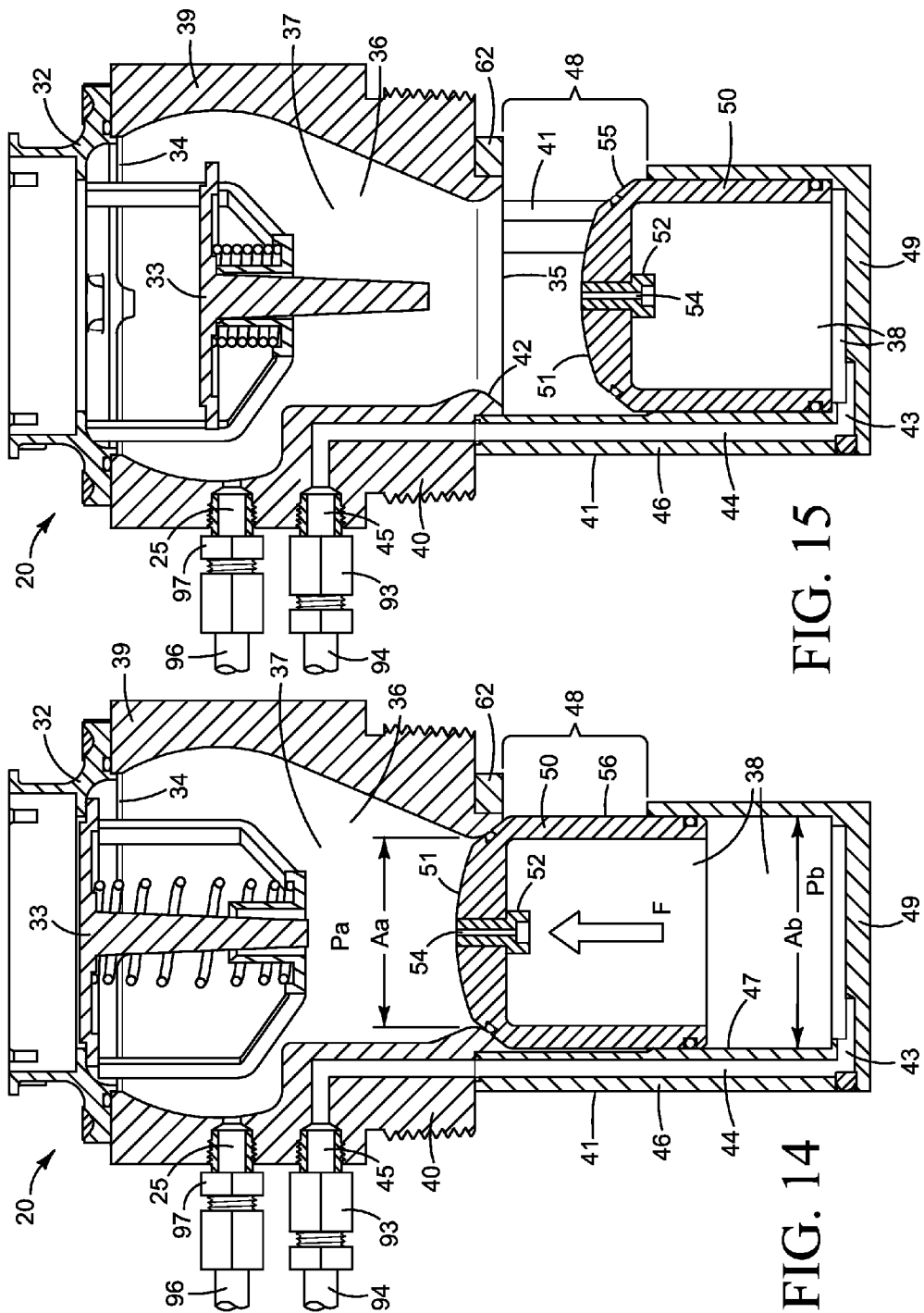

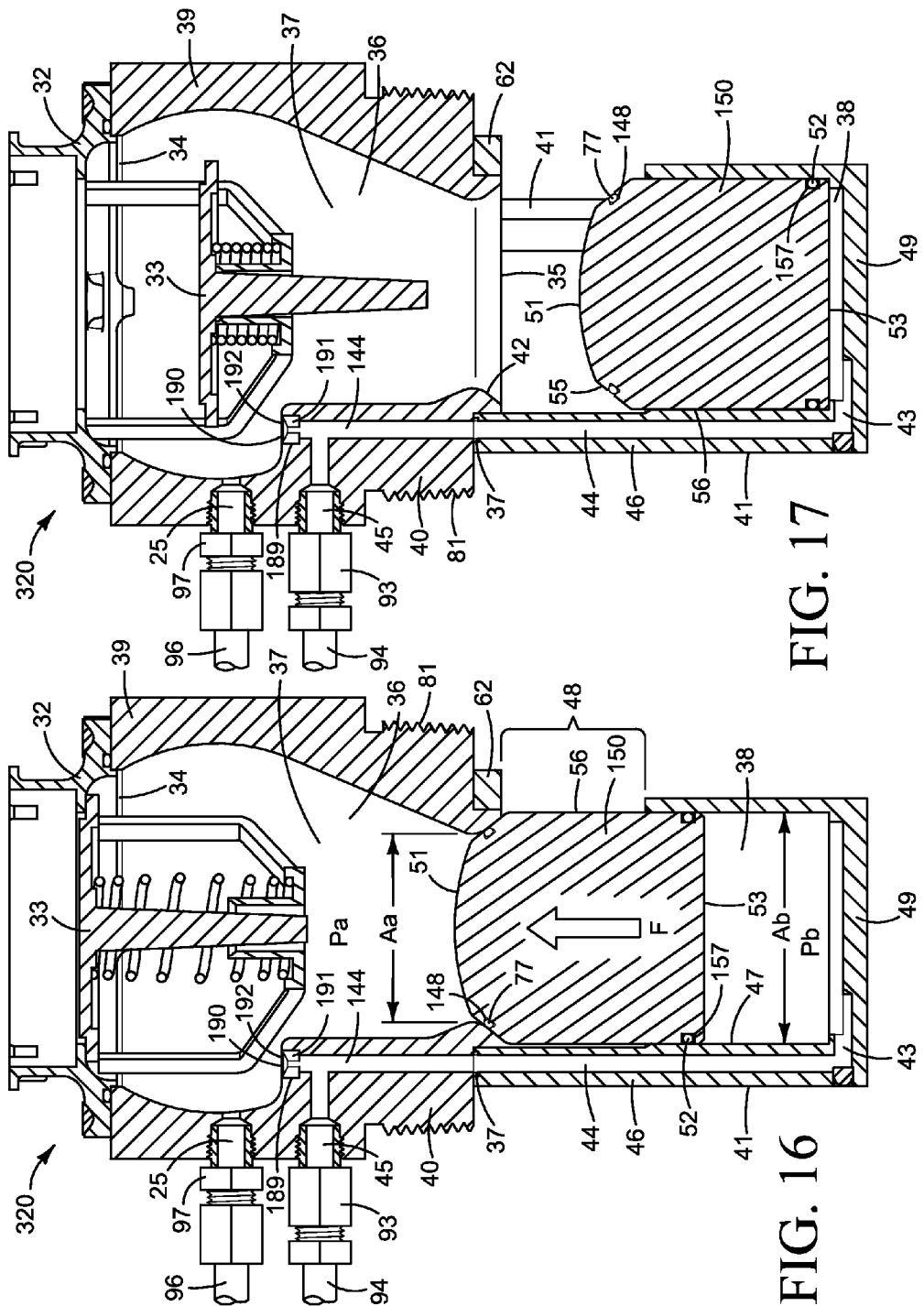

REFILLING APPARATUS WITH JET LEVEL SENSOR

PRIORITY/CROSS-REFERENCE TO RELATED APPLICATIONS

This application claims the benefit of U.S. Provisional Application No. 61/543,129, filed 4 Oct. 2011, U.S. Provisional Application No. 61/543,799, filed 5 Oct. 2011, and U.S. Provisional Application No. 61/691,668, filed 21 Aug. 2012, the disclosures of which are incorporated herein by reference.

INCORPORATION BY REFERENCE

This application incorporates by reference the disclosures of the following co-pending applications: Ser. No. 12/485,646, entitled "Refueling Apparatus with an Automatic Stop;" Ser. No. 12/767,310, entitled "Refueling Apparatus;" Ser. No. 13/183,905, entitled "Vertical Float Valve Assembly;" and 61/542,348, entitled "Fluid Flow Control Valve."

TECHNICAL FIELD

The disclosure generally relates to valves and jet level sensors. Particular embodiments relate to fluid flow control valves utilized with refueling apparatuses for automatically stopping fluid flow when a desired level of fluid in a container is attained through use of a jet level sensor.

BACKGROUND

A variety of applications require the ability to rapidly fill a container with a fluid. To accomplish this rapid filling, the fluid is typically pumped (under pressure) into the container. Due to this rapid filling, such applications typically include means for quickly shutting off the flow of fluid when the container reaches a predetermined level of fluid held therein so as to prevent overfilling and/or spillage of the fluid. Such applications typically include a fluid level sensor for sensing the level of the fluid.

One type of a fluid level sensor is a "jet level sensor." Jet level sensors technology has been available for decades, and is primarily used today to control bottom loading valves on large fuel tanker trucks. A jet level sensor operates without any moving parts. Because of that, a jet level sensor can (theoretically) work indefinitely without needing worn parts to be replaced or maintained. Jet level sensors can be horizontally or vertically oriented within the container.

Horizontal jet level sensors. Many traditional jet level designs have been established around a horizontal jet stream installation. This enables the fluid level in the tank to reach a single critical point on the body of the jet level where the jet becomes submerged and reaches a cross port on the outlet side of the jet causing the fluid stream to attach to an adjacent curved surface all at a simultaneous time. The occurrence of these happening at a time ensures that the fluid stream is diverted from the receiving point and stays diverted across a wide range of pressures (1-150 psi).

When a traditional horizontal jet level is oriented vertically, this causes these functional features to occur at different times (fluid levels) which impacts the sensors ability to shut off at a single point and remain "off" across a wide range of pressures. When the jet level is vertically oriented in the container, as the container is filled, the jet receiver is submerged first, followed by a cross port (if present), and finally the jet nozzle. At low pressures, when the jet receiver becomes submerged, there is enough turbulence to cause the jet stream to be disrupted and an associated pilot valve will close. However, at high pressures, there may not be enough turbulence to cause the jet stream to be clearly disrupted. When this happens, a "hammering" effect may result where the valve repeatedly opens and closes as the system goes from high to low pressure until such time it reaches the cross port and begins introducing enough fluid through the cross port to cause clear disruption of the jet stream. Because of this issue, prior art jet level sensors tend to not work well across a range of pressures, and regularly, in such a high pressure environment, fail to shut off at a single predetermined level, as desired. Additionally, this cycling on and off occurs at relatively high pressures and can cause damage to pumps and infrastructure.

Another common issue in such systems (which have a cross port), is the occurrence of air bubbles as a result from the fluid spray. These air bubbles can interfere with the "priming" of the cross port, decreasing the cross port's ability to timely disrupt the jet stream.

SUMMARY OF THE DISCLOSURE

Several exemplary refilling systems are described herein.

An exemplary refilling system for use in refilling a container with a fluid from a fluid source comprises a pilot-operated fluid flow control valve and a fluid level sensor. The container has an air space above a fluid space. The fluid has a fluid level within the container. The pilot-operated fluid flow control valve is fluidly connected with the fluid level sensor via a pressure line and a bleed line.

The pilot operated fluid flow control valve comprises a housing, a main fluid flow passageway extending through the housing, a valve closure element interrupting the main fluid flow passageway and able to move from a first position where the main fluid flow passageway is interrupted to a second position where the main fluid flow passageway is not interrupted.

The pressure line in fluid communication with the control valve and the fluid level sensor. The bleed line in fluid communication with the control valve and the fluid level sensor.

The fluid level sensor comprising a pressure operated level sensor and pilot valve. The pressure operated level sensor fluidly connects with the pressure line. The pressure line transmits pressure from the control valve to the fluid level sensor.

The pressure operated level sensor for sensing the level of fluid in the container. Wherein if the level of fluid sensed is below a predetermined level, the pressure operated level sensor outputs a minimum pressure through a posterior pressure passageway to the pilot valve. Wherein if the level of fluid sensed is equal to or above a predetermined level, the pressure operated level sensor outputs less than a minimum pressure through a posterior pressure passageway to the pilot valve.

The pilot valve comprises an inlet fluidly connected to the bleed line, an outlet, and an interrupt valve. The interrupt valve is able to move between an open position, where fluid can pass from the bleed line through the pilot valve, and a closed position, where the fluid is prevented from passing through the pilot valve. The pilot valve is fluidly connected with the posterior pressure passageway.

Responsive to less than a minimum pressure from the posterior pressure passageway, the interrupt valve moves to its closed position. Responsive to at least a minimum pressure from the posterior pressure passageway, the interrupt valve moves to its open position.

If the pilot valve is closed, the valve closure element of the control valve moves to its first position. If the pilot valve is open, the valve closure element of the control valve moves to its second position.

Optionally, the pressure operated level sensor comprises a jet level sensor.

Another exemplary refilling system for use in refilling a container with a fluid from a fluid source comprises a pilot-operated fluid flow control valve and a fluid level sensor. The container has an air space above a fluid space. The fluid has a fluid level within the container. The pilot-operated fluid flow control valve is fluidly connected with the fluid level sensor via a pressure line and a bleed line.

The pilot operated fluid flow control valve comprises a housing, a main fluid flow passageway extending through the housing, a valve seat, a first chamber, a piston, a second chamber, and a vent passageway.

The main fluid flow passageway extends between an inlet orifice and an outlet orifice. The valve seat is located in the main fluid flow passageway. The first chamber is defined between the inlet orifice and the outlet orifice.

The piston is reciprocable axially of the seat within a cylinder. The cylinder extends between a seat end and a dome end. The piston having a sealing face. The piston movable in-between a first position, where the sealing face engages the valve seat thereby closing the main fluid flow passageway, and a second position, where the sealing face is not engaged with the valve seat and wherein the main fluid flow passageway is open.

The second chamber is located adjacent the dome end. The vent passageway connects the main fluid flow passageway with the second chamber. The second chamber fluidly connects via the bleed line to the fluid level sensor.

The pressure line is in fluid communication with the first chamber and the fluid level sensor. The bleed line in fluid communication with the second chamber and the fluid level sensor.

The fluid level sensor comprising a pressure operated level sensor and a pilot valve. The pressure operated level sensor fluidly connects with the pressure line. The pressure line transmits pressure from the first chamber to the fluid level sensor.

The pressure operated level sensor for sensing the level of fluid in the container. Wherein if the level of fluid sensed is below a predetermined level, the pressure operated level sensor outputs a minimum pressure through a posterior pressure passageway to the pilot valve. Wherein if the level of fluid sensed is equal to or above a predetermined level, the pressure operated level sensor outputs less than a minimum pressure through a posterior pressure passageway to the pilot valve.

The pilot valve comprises an inlet fluidly connected to the bleed line, an outlet, and an interrupt valve. The interrupt valve able to move between an open position, where fluid can pass from the bleed line through the pilot valve, and a closed position, where the fluid is prevented from passing through the pilot valve. The pilot valve is fluidly connected with the posterior pressure passageway.

Wherein, responsive to less than a minimum pressure from the posterior pressure passageway, the interrupt valve moves to its closed position. Wherein, responsive to at least a minimum pressure from the posterior pressure passageway, the interrupt valve moves to its open position. Wherein, when the pilot valve is closed, the pressure in the second chamber increases and the piston moves to its first position closing the main fluid flow passageway. Wherein, when the pilot valve is open, the pressure in the second chamber decreases and the piston moves to its second position opening the main fluid flow passageway.

Optionally, the inlet orifice comprises a dry disconnect receptacle. Optionally, the vent passageway comprises a port through the piston. Optionally, the pressure line fluidly connects an axial pressure port defined through the pilot-operated fluid flow control valve housing with a distal pressure port defined through the fluid level sensor housing. Further optionally, the distal pressure port is in fluid communication with an anterior pressure passageway.

Optionally, the bleed line fluidly connects an axial bleed port defined through the pilot-operated fluid flow control valve housing with a distal bleed port defined in the fluid level sensor housing. Further optionally, the distal bleed port is in fluid communication with an inlet passageway, and the axial bleed port fluidly connects with a bleed line connecting with the second chamber.

Optionally, the pressure operated level sensor comprises a jet level sensor. Further optionally, the jet level sensor comprises a jet nozzle spaced apart from a jet receiver; the jet receiver is aligned with the jet nozzle so as to provide an output liquid pressure signal through a posterior pressure passageway to a pressure orifice.

Optionally, the pressure line fluidly connects an axial pressure port defined through the pilot-operated fluid flow control valve housing and a distal pressure port defined in the fluid level sensor housing. Further optionally, the distal pressure port is in fluid communication with an anterior pressure passageway which provides pressure to the jet nozzle.

Optionally, the pilot valve comprises a diaphragm valve assembly. Further optionally, the diaphragm valve assembly comprises a diaphragm valve, a stem, a seat, a valve member, and a pilot valve passageway. The stem extending from the diaphragm valve to the valve member. The valve member configured for sealing engagement of the seat. The pilot valve passageway through the pilot valve, from the inlet passageway which connects with the bleed line through the seat out to the outlet passageway. The valve member interrupts the bleed line. Further optionally, a spring holds the valve member in sealing engagement with the seat. Pressure above minimum from the pressure orifice on the underside of the diaphragm is able to overcome the spring pressure, opening the diaphragm valve by pushing valve member away from the seat.

Optionally, the fluid level sensor is mounted on the top surface of the container and extends downwards into the container.

Another exemplary refilling system for use in refilling a container with a fluid from a fluid source comprises a pilot-operated fluid flow control valve and a fluid level sensor. The container has an air space above a fluid space. The fluid has a fluid level within the container. The pilot-operated fluid flow control valve is fluidly connected with the fluid level sensor via a pressure line and a bleed line.

The pilot operated fluid flow control valve comprises a housing, a main fluid flow passageway extending through the housing, a valve seat, a first chamber, a piston, a second chamber, and a vent passageway.

The main fluid flow passageway extends between an inlet orifice and an outlet orifice. The valve seat is located in the main fluid flow passageway. The first chamber is defined between the inlet orifice and the outlet orifice.

The piston is reciprocable axially of the seat within a cylinder. The cylinder extends between a seat end and a dome end. The piston having a sealing face. The piston movable in-between a first position, where the sealing face engages the valve seat thereby closing the main fluid flow passageway, and a second position, where the sealing face is not engaged with the valve seat and wherein the main fluid flow passageway is open.

The second chamber is located adjacent the dome end. The vent passageway connects the main fluid flow passageway with the second chamber. The second chamber fluidly connects via the bleed line to the fluid level sensor.

The pressure line is in fluid communication with the first chamber and the fluid level sensor. The bleed line in fluid communication with the second chamber and the fluid level sensor. The pressure line fluidly connects an axial pressure port defined through the pilot-operated fluid flow control valve housing with a distal pressure port defined through the fluid level sensor housing. The bleed line fluidly connects an axial bleed port defined through the pilot-operated fluid flow control valve housing with a distal bleed port defined in the fluid level sensor housing;

The fluid level sensor comprises a jet level sensor and a pilot valve. The jet level sensor fluidly connects with the pressure line. The pressure line transmits pressure from the first chamber to the fluid level sensor. The jet level sensor comprises a jet nozzle spaced apart from a jet receiver. The jet receiver is aligned with the jet nozzle so as to provide an output liquid pressure signal through a posterior pressure passageway to a pressure orifice. The jet level sensor for sensing the level of fluid in the container. Wherein, if the level of fluid sensed is below a predetermined level, the jet level sensor outputs a minimum pressure through the posterior pressure passageway. Wherein, if the level of fluid sensed is equal to or above a predetermined level, the jet level sensor outputs less than a minimum pressure through the posterior pressure passageway.

The pilot valve comprises an inlet fluidly connected to the bleed line, an outlet, and an interrupt valve. The interrupt valve able to move between an open position, where fluid can pass from the bleed line through the pilot valve, and a closed position, where the fluid is prevented from passing through the pilot valve. The pilot valve is fluidly connected with the posterior pressure passageway.

Wherein, responsive to less than a minimum pressure from the posterior pressure passageway, the interrupt valve moves to its closed position. Wherein, responsive to at least a minimum pressure from the posterior pressure passageway, the interrupt valve moves to its open position. Wherein, when the pilot valve is closed, the pressure in the second chamber increases and the piston moves to its first position closing the main fluid flow passageway. Wherein, when the pilot valve is open, the pressure in the second chamber decreases and the piston moves to its second position opening the main fluid flow passageway.

Optionally, the inlet orifice comprises a dry disconnect receptacle. Optionally, the vent passageway comprises a port through the piston. Optionally, the pressure line fluidly connects an axial pressure port defined through the pilot-operated fluid flow control valve housing and a distal pressure port defined in the fluid level sensor housing. Further optionally, the distal pressure port is in fluid communication with an anterior pressure passageway which provides pressure to the jet nozzle.

Optionally, the pilot valve comprises a diaphragm valve assembly. Further optionally, the diaphragm valve assembly comprises a diaphragm valve, a stem, a seat, a valve member, and a pilot valve passageway. The stem extending from the diaphragm valve to the valve member. The valve member configured for sealing engagement of the seat. The pilot valve passageway through the pilot valve, from the inlet passageway which connects with the bleed line through the seat out to the outlet passageway. The valve member interrupts the bleed line. Further optionally, a spring holds the valve member in sealing engagement with the seat. Pressure above minimum from the pressure orifice on the underside of the diaphragm is able to overcome the spring pressure, opening the diaphragm valve by pushing valve member away from the seat.

Optionally, the fluid level sensor is mounted on the top surface of the container and extends downwards into the container.

Additional understanding of the devices and methods contemplated and/or claimed by the inventor(s) can be gained by reviewing the detailed description of exemplary devices and methods, presented below, and the referenced drawings.

BRIEF DESCRIPTION OF THE DRAWINGS

FIG. 14 is a cross-sectional view of an exemplary pilot operated fluid flow control valve of a fifth exemplary refilling system, shown in its closed position.

FIG. 15 is a cross-sectional view of the exemplary pilot operated fluid flow control valve illustrated in FIG. 14, shown in its open position.

FIG. 16 is a cross-sectional view of an exemplary pilot operated fluid flow control valve of a sixth exemplary refilling system, shown in its closed position.

FIG. 17 is a cross-sectional view of the exemplary pilot operated fluid flow control valve illustrated in FIG. 16, shown in its open position.

DETAILED DESCRIPTION

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "e.g.," "etc," "for instance," "in example," and "or" and grammatically related terms indicates non-exclusive alternatives without limitation, unless otherwise noted. The use of "including" and grammatically related terms means "including, but not limited to," unless otherwise noted. The use of the articles "a," "an" and "the" are meant to be interpreted as referring to the singular as well as the plural, unless the context clearly dictates otherwise. Thus, for example, reference to "a jet level sensor" includes two or more such jet level sensors, and the like. The use of "exemplary" means "an example of" and is not intended to convey a meaning of an ideal or preferred embodiment.

Figure 1:
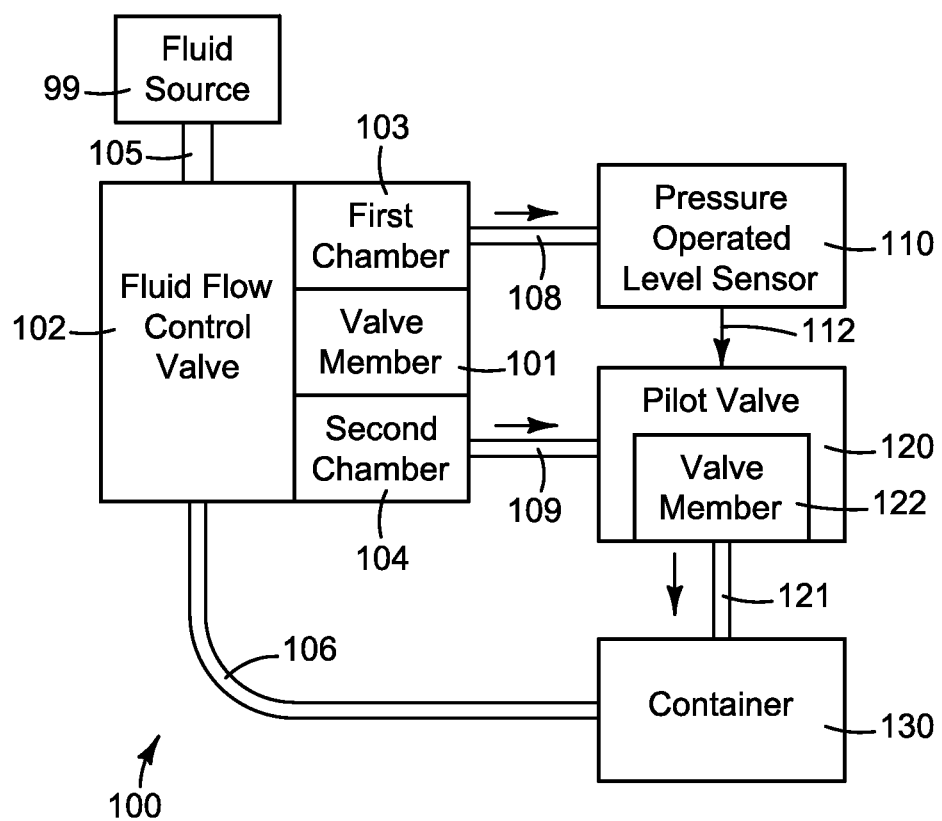
FIG. 1 is a schematic representation of a first exemplary refilling system.

Referring initially to FIG. 1, illustrated is a schematic representation of a first exemplary refilling system 100. The system 100 comprises a fluid flow control valve 102, a pressure operated level sensor 110, and a pilot valve 120. The fluid flow control valve 102 having a first chamber 103 and a second chamber 104. A valve member 101 able to be opened and closed separating the first chamber 103 from the second chamber 104. The fluid flow control valve 102 connecting via an inlet 105 to a fluid source 99, and via an outlet 106 to a container 130. The first chamber 103 for supplying pressure, via a pressure line 108, to the pressure operated level sensor 110. It is preferred that the pressure line 108 be unregulated.

The second chamber 104 supplies a flow of bleed fluid, via a bleed line 109, through the passageway of the pilot valve 120 and into a container 130 via an outlet 121. The pilot valve 120 has a valve member 122 which interrupts the pilot valve passageway. The pressure operated level sensor 110 provides pressure via posterior pressure line 112 to said valve member 122, thereby opening said valve member 122 and allows bleed fluid to flow through said bleed line 109 through the passageway of the pilot valve 102 and into the container 130 via the outlet 121. Wherein when the pressure operated level sensor 110 senses that the fluid level in the container 130 is at or above a predetermined level, the pressure operated level sensor 110 decreases the amount of pressure, and/or stops providing pressure, to the valve member 122, resulting in the valve member 122 closing and cutting off the flow of bleed fluid into the container 130. When the flow of bleed fluid into the container 130 is stopped, the valve member 101 of the fluid flow control valve closes, prevents fluid from flowing from the fluid source 99 through inlet 105, through the fluid flow control valve 102, out the outlet 106, and into the container 130.

Figures 12, 13:
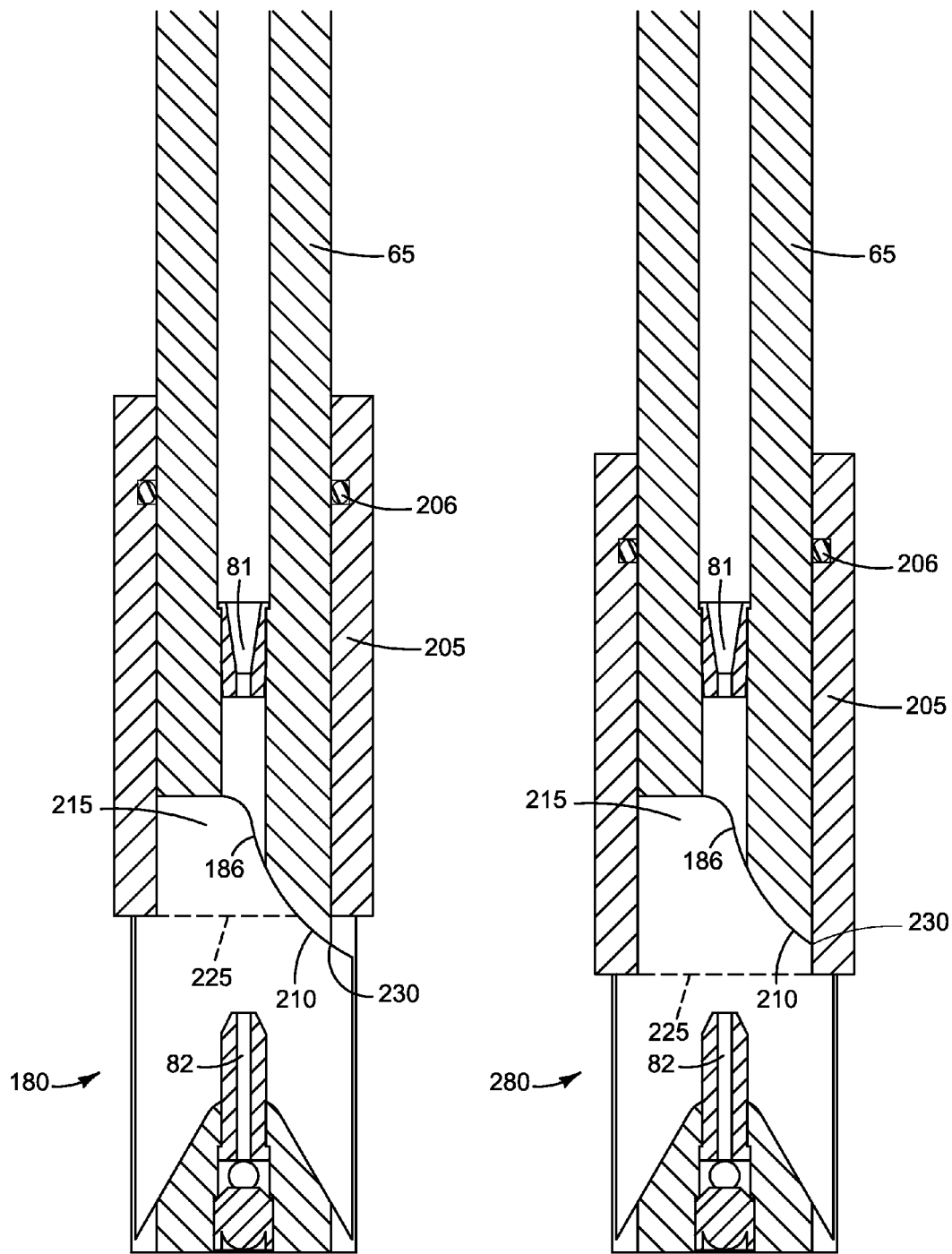
FIG. 12 is a partial, cross-sectional view of a second jet level sensor of the pressure operated level sensor of FIG. 3.
FIG. 13 is a partial, cross-sectional view of a third jet level sensor of the pressure operated level sensor of FIG. 3.

FIGS. 2 through 15 illustrate a second exemplary refilling system 10. The refilling system 10 comprises: a pilot-operated fluid flow control valve 20 fluidly connected with a fluid level sensor 70 via a pressure line 96 and a bleed line 94. The fluid level sensor 70 is further illustrated in FIGS. 3 through 11. The pilot-operated fluid flow control valve 20 is further illustrated in FIGS. 14 and 15. FIGS. 12 and 13 illustrate two additional exemplary fluid level sensors.

The refilling system 10 shown installed on a container 6. One exemplary container 6 is a fuel tank for a vehicle or other machinery (e.g., locomotives, automobiles, large tracked excavators, cranes, farm equipment, industrial equipment). Other exemplary containers include, but are not limited to fluid storage vessels, storage tanks, and freight railcars for hauling liquids (e.g., fuel, oil, natural gas, ethanol, chemicals, food stuff (e.g., milk, corn syrup), water).

The refilling system 10 for use in refilling the container 6 with a fluid from a fluid source (not illustrated). The container 6 has an air space above a fluid space when fluid is present in the container 6. The surface of the fluid space defines a fluid level 8 within the container 6.

Figure 2:
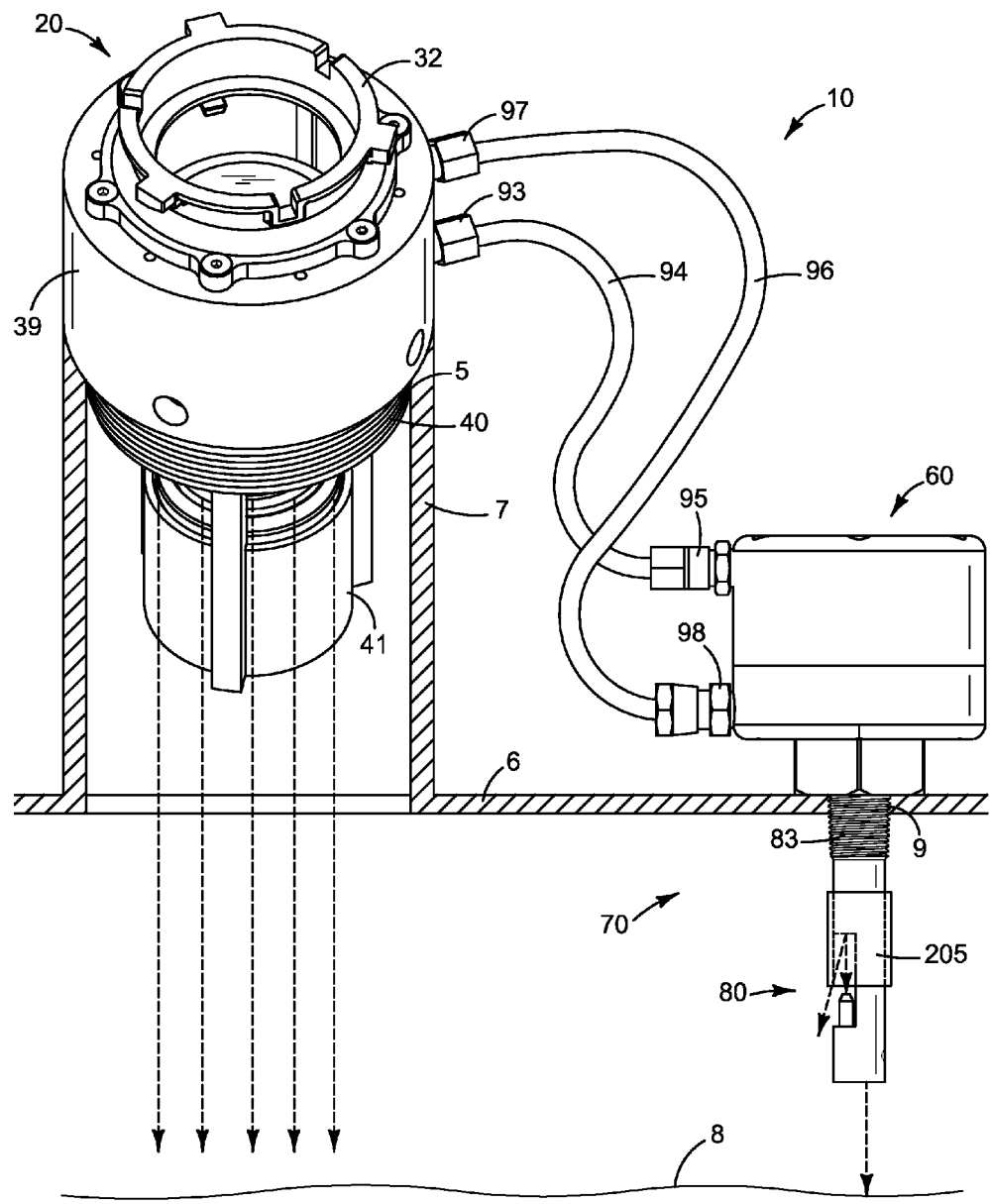
FIG. 2 is a perspective view of a second exemplary refilling system.

The refilling system 10 comprising a pilot-operated fluid flow control valve, such as the pilot-operated fluid flow control valves 20 illustrated in FIGS. 2, 14 and 15, and a fluid level sensor 70. The pilot-operated fluid flow control valve 20 interrupts the flow of fluid from the fluid source into the container 6. The control valve 20 has an open position whereby fluid can flow from the fluid source into the container 6, and a closed position whereby fluid is prevented from flowing from the fluid source into the container 6.

The fluid level sensor 70 senses the fluid level 8 in the container 6. In the second exemplary refilling system illustrated in the Figures, the fluid level sensor 70 comprises an assembly of a surge resistant jet level sensor 80 and a pilot valve 60. While the figures show the surge resistant jet level sensor 80 and the pilot valve 60 assembled together as a unitary fluid level sensor 70, in exemplary systems the surge resistant jet level sensor 80 could be separate from the pilot valve 60.

In the illustrated fluid level sensor 70, the pilot valve 60 is mounted on the top surface of the container 6, and the surge resistant jet level sensor 80 extends downwards through a port 9 into the container 6. In other exemplary refilling systems, the pilot valve 60 could be installed inside the container 6.

Upon sensing a fluid level 8 at or above a predetermined level, the fluid level sensor 70 closes the pilot-operated fluid flow control valve (if the control valve is open), thereby shutting off a flow of fluid from the fluid source through the fluid flow control valve 20 and into the container 6. For example, the surge resistant jet level sensor 80, in sensing the fluid level 8 at or above a predetermined level, could decrease, or cease, the supply of pressure holding the pilot valve 60 open, thereby resulting in the pilot valve 60 closing. The closure of the pilot valve 60 blocks the flow of bleed fluid from the second chamber 38, which results in the valve closure element 51 of the fluid flow control valve 20 closing, thereby stopping the flow of fluid from the fluid source into the container 6.

Upon sensing a fluid level 8 below a predetermined level, the fluid level sensor 70 opens the pilot-operated fluid flow control valve 20 (or permits the control valve 20 to open), thereby permitting a flow of fluid from a fluid source (if present) to flow through the fluid flow control valve 20 and into the container 6. For example, the surge resistant jet level sensor 80, in sensing the fluid level 8 below a predetermined level, could supply pressure to the pilot valve 60, thereby resulting in the opening of the pilot valve 60. When the pilot valve 60 is open, bleed fluid is able to flow from the second chamber 38 of the fluid flow control valve 20 through the pilot valve 60 and into the container 6. The flow of bleed fluid triggers the valve closure element 51 of the fluid flow control valve 20 to open, thereby permitting fluid to flow from the fluid source, through the fluid flow control valve, and into the container 6.

Figure 3:
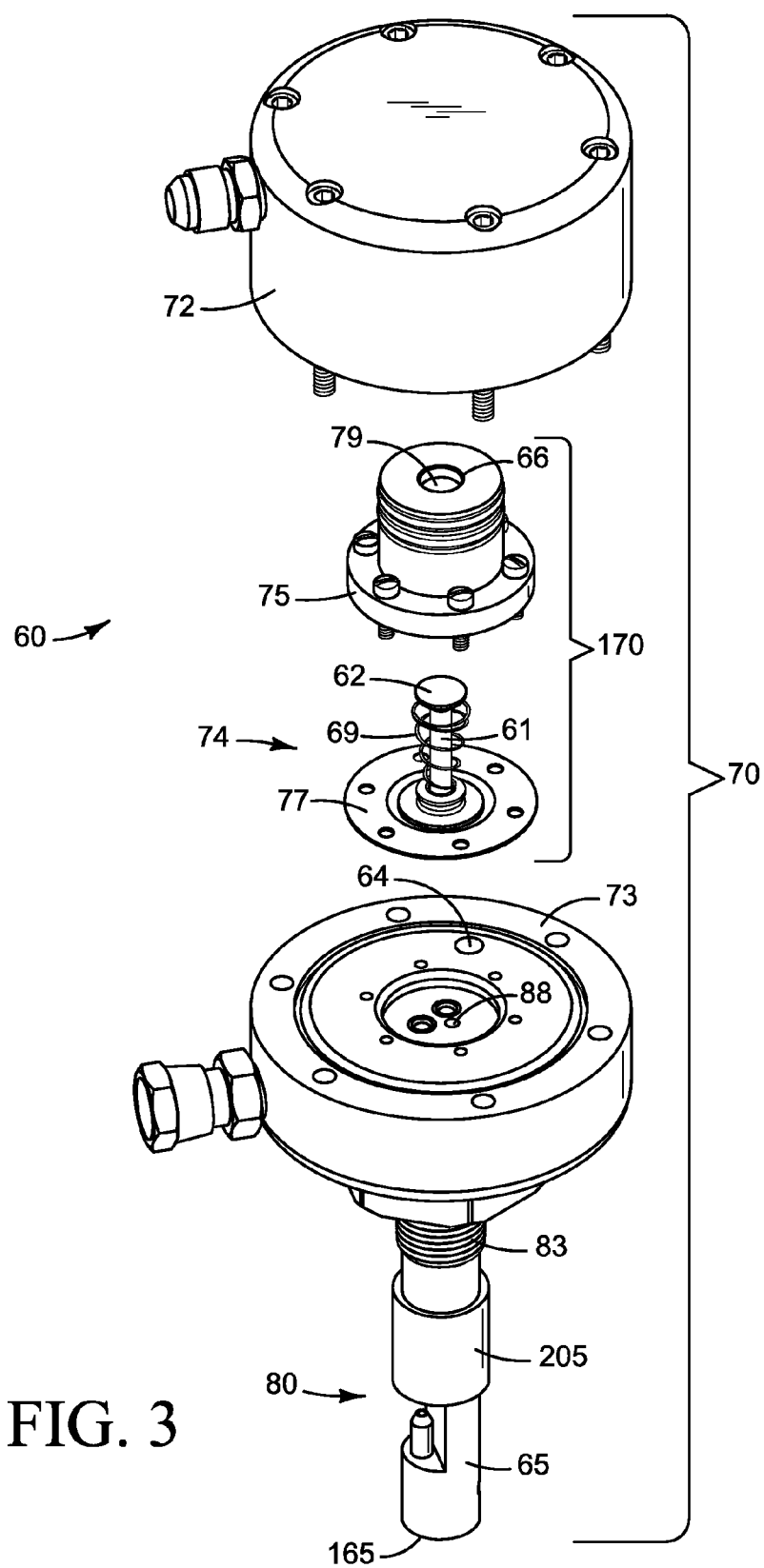
FIG. 3 is an exploded view of the pressure operated level sensor of a third exemplary refilling system.

FIG. 3 is an exploded view of the pilot valve of a third exemplary refilling system. A pilot valve holds a pilot-operated control valve open in response to a pressure signal form a pressure operated level sensor. FIG. 3 illustrates the fluid level sensor 70 comprises a pilot valve 60 and a surge resistant jet level sensor 80. The surge resistant jet level sensor 80 is a pressure operated level sensor. While FIG. 3 illustrates the pilot valve 60 as a diaphragm actuated pilot shutoff valve (diaphragm valve), such an illustration is not intended to limit the types of fluid level sensors or pilot valves that could be utilized. Likewise, the surge resistant jet level sensor 80 could be replaced with a different form of a pressure operated level sensor.

The fluid level sensor 70 comprises an interrupt valve 74 for interrupts the flow of a bleed fluid from the pilot-operated fluid flow control valve to the container. The interrupt valve 74 comprises a diaphragm actuated pilot shutoff valve assembly (diaphragm valve assembly 170). The diaphragm valve assembly 170 positioned within a housing 72. The housing 72 connects to a base 73. The housing 72 includes a cap 75 having defined there-through an aperture 79. A seat 66 is adjacent the aperture 79.

The diaphragm valve assembly 170 further comprises a diaphragm valve 77 having an upper face and a lower face, and a centrally actuating stem 61 (actuator) extends from the diaphragm valve 77 to a valve member 62. The diaphragm valve assembly 170 assembled so that the stem 61 extends through the aperture 79 so that the valve member 62 is located adjacent the seat 66. A spring 69 is provided for biasing the valve member 62 seated at the seat 66. The valve member 62 configured for sealing engagement with the seat 66, thereby interrupting the flow of fluid through the interrupt valve 74.

Figure 4:
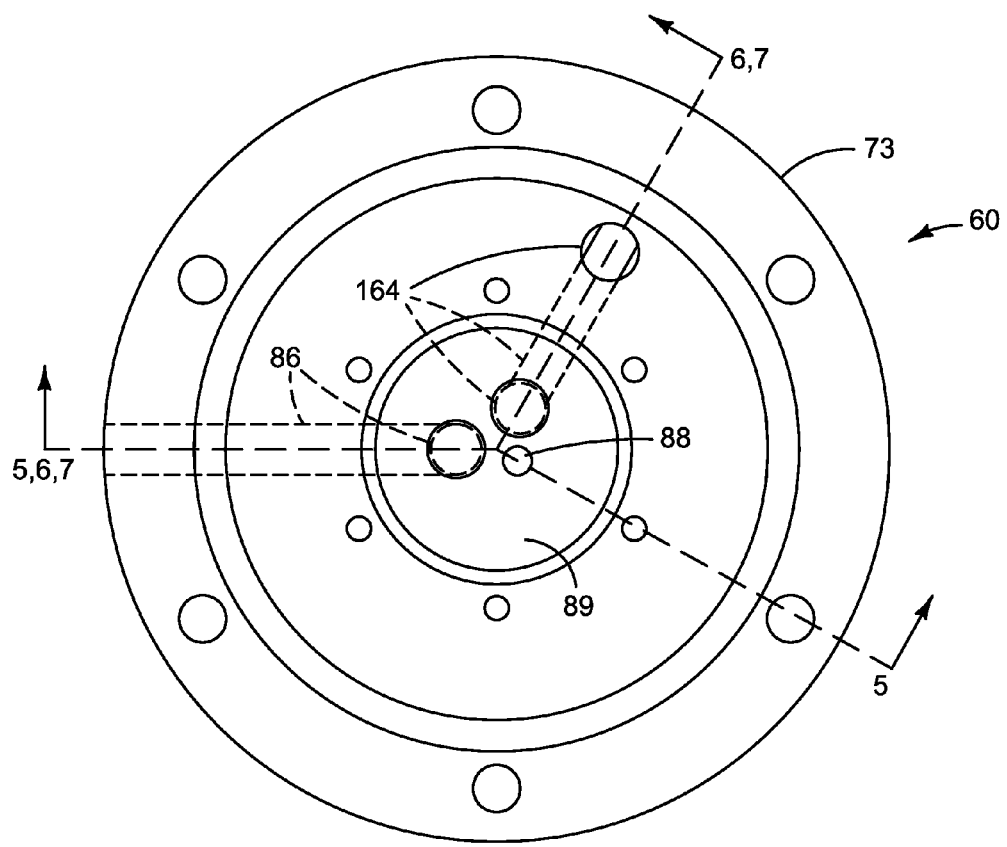
FIG. 4 is a partial, top plan view of the pressure operated level sensor illustrated in FIG. 3.
Figure 5:
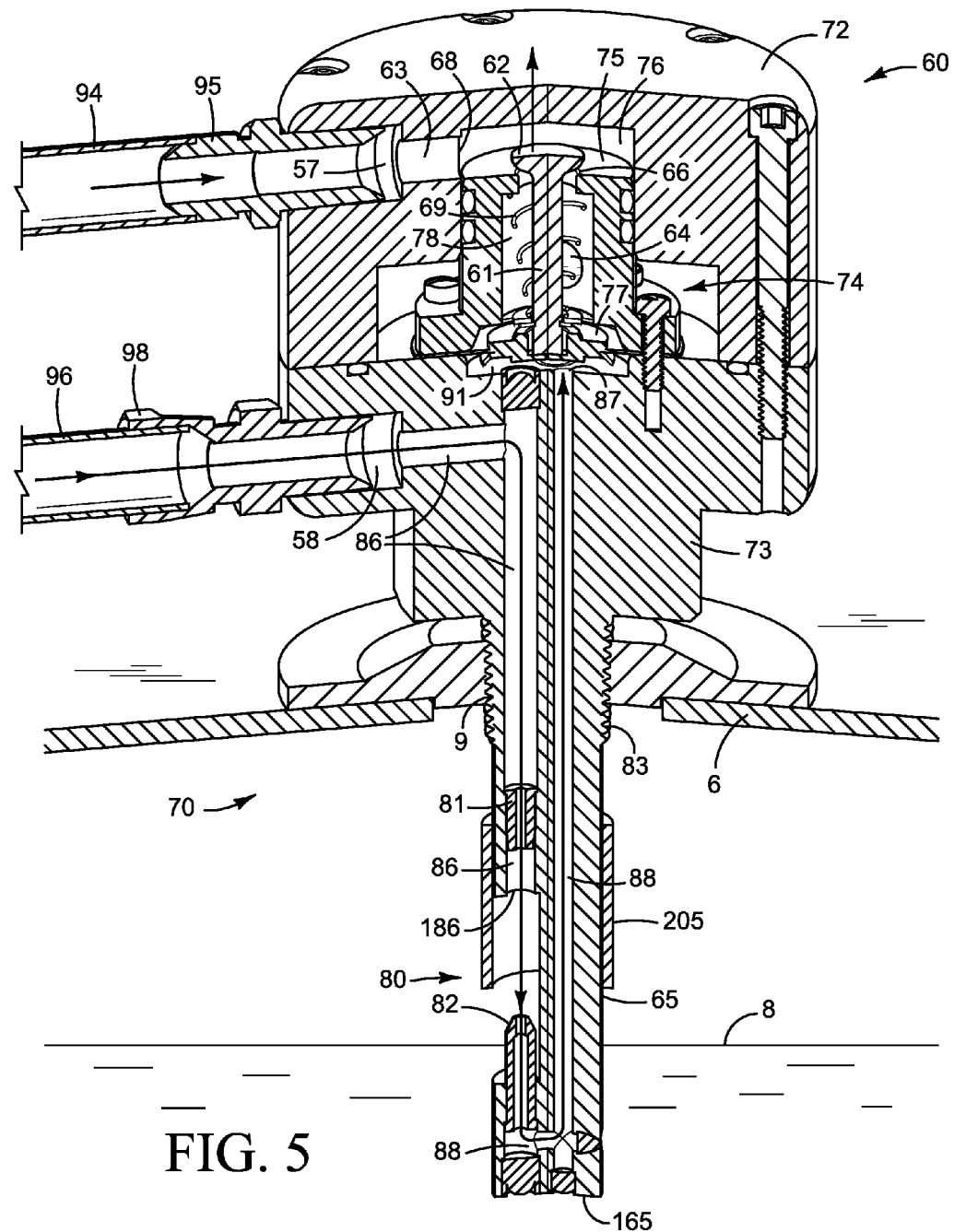
FIG. 5 is a cross-sectional view along the line 5-5 illustrated in the pressure operated level sensor of FIG. 4.
Figure 6:
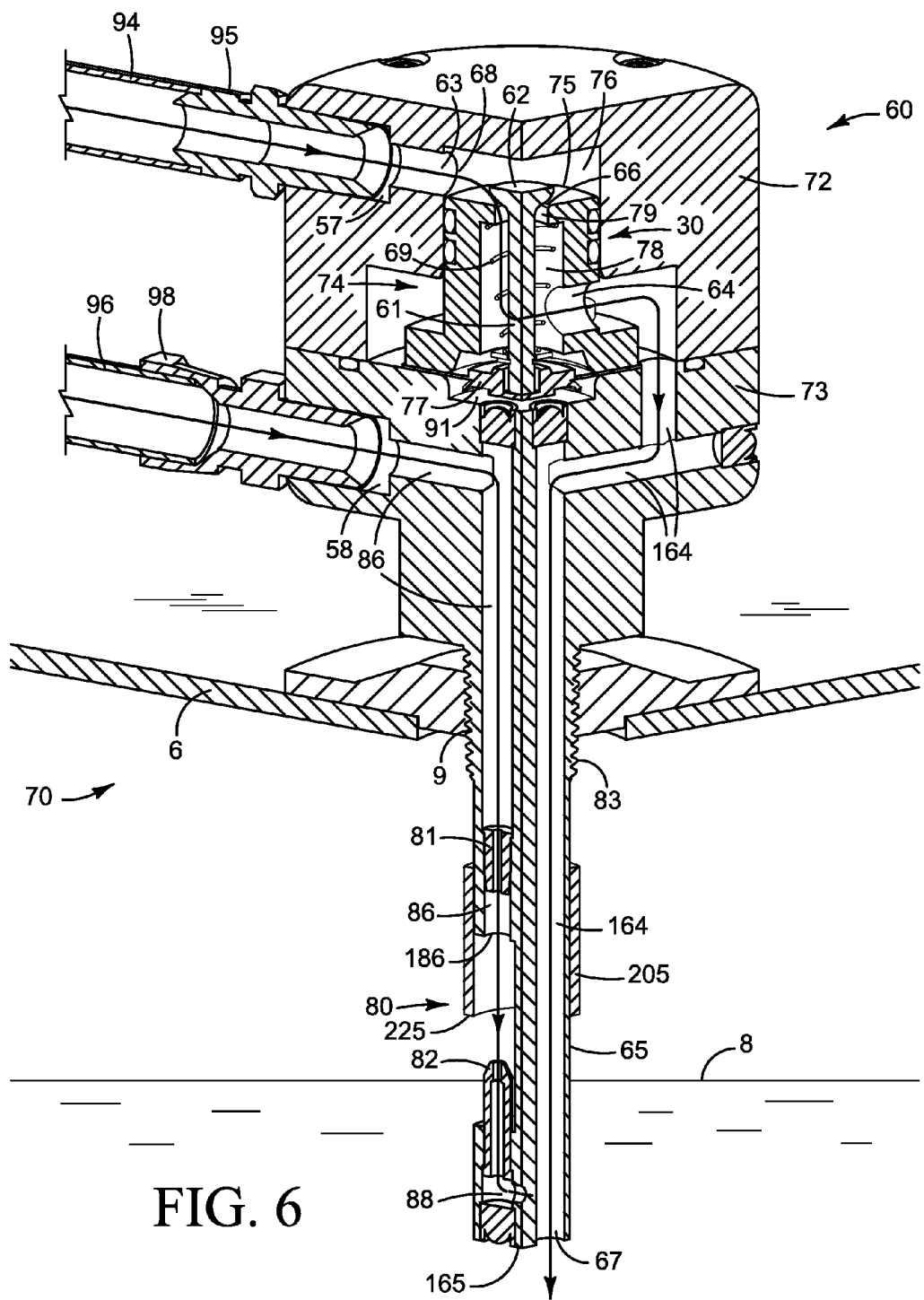
FIG. 6 is a cross-sectional view along the line 6-6 illustrated in the pressure operated level sensor of FIG. 4.
Figure 7:
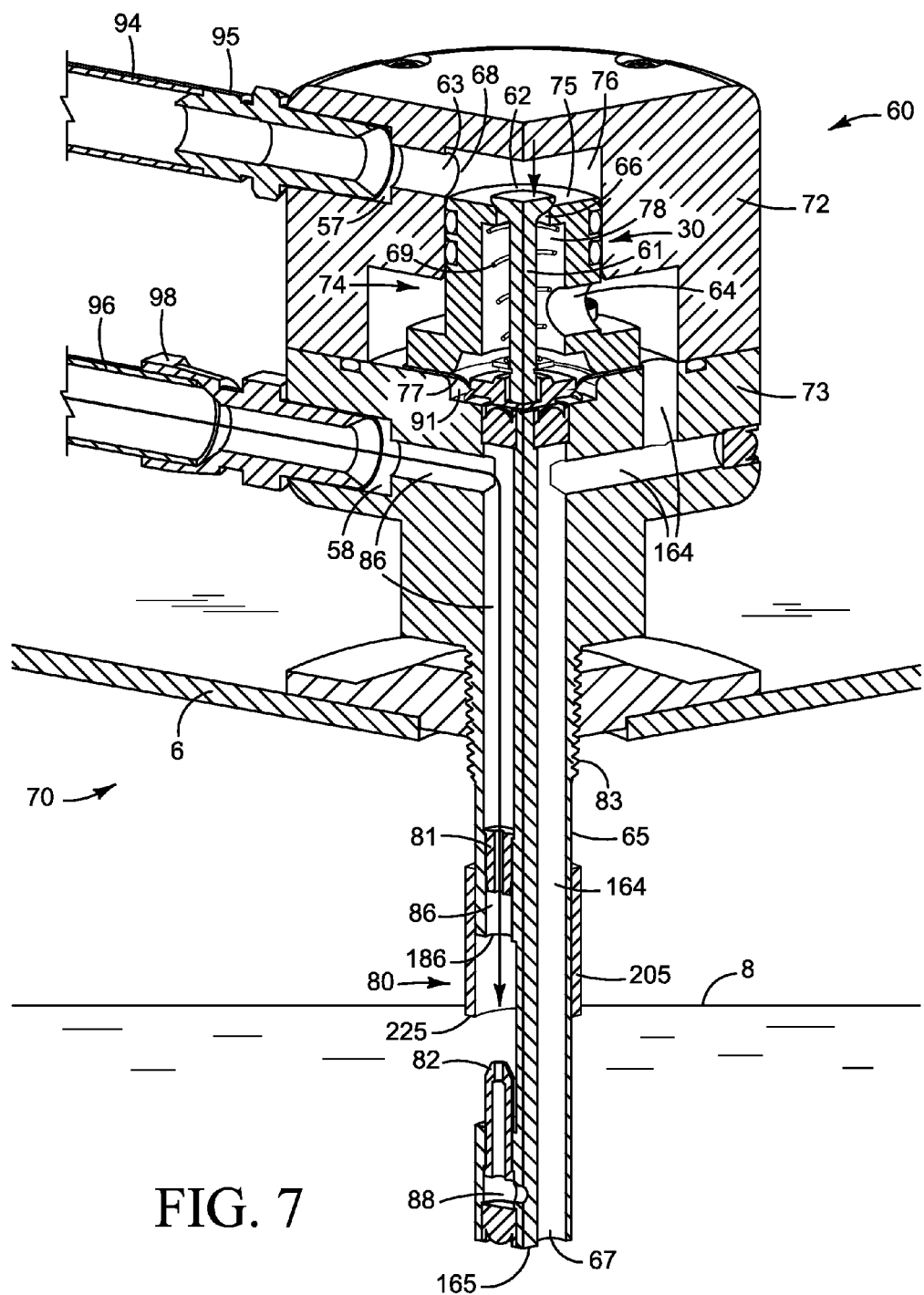
FIG. 7 is a cross-sectional view along the line 7-7 illustrated in the pressure operated level sensor of FIG. 4.

FIG. 4 illustrates a partial, top plan view of a fluid level sensor 70 of a fourth exemplary refilling apparatus. FIG. 5 illustrates a cross-sectional view along the line 4-4 illustrated in FIG. 4. FIG. 6 illustrates a cross-sectional view along the line 5-5 illustrated in FIG. 4. FIG. 7 illustrates a cross-sectional view along the line 6-6 illustrated in FIG. 4.

While these figures illustrate the surge resistant jet level sensor 80 in conjunction with a particular refilling system 10, pressure operated level sensor 70, and pilot valve 60, the surge resistant jet level sensor 80 could be utilized apart from the refilling system 10, pressure operated level sensor 70, and pilot valve 60, and could be used in any pressure operated level sensor application. It is preferred that the pressure operated level sensor be able to work across a range of pressures (e.g., from 3 psi to 150 psi), and reliably shut off at a single predetermined pressure level.

In the second exemplary refilling system, the fluid level sensor 70 comprises a surge resistant jet level sensor 80 and pilot valve 60. The surge resistant jet level sensor 80 fluidly connects with a pressure line 96. The pressure line 96 transmits pressure from the pilot-operated fluid flow control valve 20 to the pressure operated level sensor 70.

The pressure line 96 has a first portion (e.g., a first end) extends to a second portion (e.g., a second end). At the first portion, the pressure line 96 connects, via an axial pressure port fitting 97, to the axial pressure port 25 of the valve body portion 40 of the pilot-operated fluid flow control valve 20. The axial pressure port 25 defined through valve body portion 40, connects with first chamber 36. At the second portion, the pressure line 96 connects, via a distal pressure fitting 98, to the distal pressure port 58 of the fluid level sensor 70. The distal pressure port 58 defined through the housing 72 of the fluid level sensor 70, connects with an anterior pressure passageway 86. The pressure line 96 thusly connected able to provide pressure from the first chamber 36 to the surge resistant jet level sensor 80.

The bleed line 94 has a first portion (e.g., a first end) which extends to a second portion (e.g., second end). At the first portion, the bleed line 94 connects, via an axial bleed port fitting 93, to the axial bleed port 45 of the valve body portion 40 of the pilot-operated fluid flow control valve 20. The axial bleed port 45 defined through valve body portion 40, connects with second chamber 38 via a bleed line 44. At a second portion, the bleed line 94 connects, via a distal bleed port fitting 95, to the distal bleed port 57 of the fluid level sensor 70. The distal bleed port 57 in fluid communication with an inlet passageway 63 of the pilot valve 60. The bleed line 94 thusly connected able to transmit a bleed fluid supply from the second chamber 38 to pilot valve 60.

In use, the pressure operated level sensor 70 senses the level 8 of fluid in the container 6. Wherein, if the level 8 of fluid sensed by the surge resistant jet level sensor 80 is below a predetermined level, the surge resistant jet level sensor 80 outputs a minimum pressure through a posterior pressure passageway 88 to an interrupt valve 74. The posterior pressure passageway 88 has a pressure orifice 87 adjacent a pressure chamber 91. Wherein, if the level 8 of fluid sensed by the surge resistant jet level sensor 80 is equal to or above a predetermined level, the surge resistant jet level sensor 80 outputs less than a minimum pressure through the posterior pressure passageway 88 to the interrupt valve 74.

In the exemplary fluid level sensor 70 illustrated in FIGS. 5 through 7, the pressure operated level sensor comprises a jet level sensor 80. The jet level sensor 80 spaced into the container 6 via an elongated body 65 extends into the container 6. The length of the elongated body 65 extends into the container 6 can be varied to set a predetermined filling level (fluid level) in the container 6. The elongated body 65 has a distal end 165.

The jet level sensor 80 comprises a jet nozzle 81 spaced apart from a jet receiver 82. In the surge resistant jet level sensor 80 illustrated in the figures, the jet nozzle 81 is located in the anterior pressure passageway 86, and is in fluid connection with the distal pressure port 58. The anterior pressure passageway 86 terminates in a jet port 186 defined in the elongated body 65. Alternatively, the anterior pressure passageway 86 could terminate in/at the tip of the jet nozzle 81. The jet nozzle 81 directs a jet flow 240 of liquid along an axis of jet flow A.

The jet level sensor 80 further comprises a jet receiver 82, a guide wall 210, and a shroud 205.

It is preferred that the jet port 186 intersect the guide wall 210, as illustrated in FIGS. 9 through 13. While intersection is preferred, a skilled artisan will be able to select an appropriate structure and location for the jet port in a particular embodiment based on various considerations, including the intended use of the jet level sensor, the intended arena within which the jet level sensor will be used, and the equipment and/or accessories with which the jet level sensor is intended to be used, among other considerations.

The jet port 186 directs a jet flow 240 of liquid along a predetermined axis of jet flow A. The jet flow 240 nominally flows within a flow space B defined along said axis of jet flow A. The flow space B has an upper end adjacent the jet port 186, and a lower end adjacent the jet receiver 82.

The jet receiver 82 located below the jet port 186, and spaced apart there-from, as illustrated in FIGS. 9 through 13. The jet receiver 82 aligned with the axis of jet flow A, and configured for receiving the jet flow 240 from the jet port 186 to provide an output liquid pressure signal through a posterior pressure passageway 88 to a pressure orifice 87 and/or pressure chamber 91, thereby maintaining a pressurized control.

The surge resistant jet level sensor 80 further comprises a shroud 205 for defines a deflection chamber 215 adjacent the jet port 186. The shroud 205 has at least one internal wall extends downwards from the jet level sensor body to a shroud rim 225. The shroud 205 extends downwards, away from the jet port 186 and towards the jet receiver 82. The shroud rim 225 located above the jet receiver 82. The shroud 205 defines an open ended deflection chamber 215 between the elongated body 65, the internal wall, the guide wall 210, and the shroud rim 225. In the jet level sensor 80 illustrated in FIGS. 9 and 10, the flow space B extends through the deflection chamber 215.

The shroud 205 also allows the pressure operated level sensor 70 to be shut off at a lower point in the container. In one exemplary surge resistant jet level sensor, the shroud comprises an open ended cylinder which is slid onto the elongated body 65 and attached into place, for instance through use of a mechanical fastener, adhesive, weld, or other commonly used manners of attachment.

The elongated body 65 defines a guide wall 210 extends generally adjacent the flow space B. In the exemplary surge resistant jet level sensor 80 illustrated in FIGS. 9 and 10, the guide wall 210 extends towards the distal end 165 of the elongated body 65 from the general area of the jet port 186, with the jet port 186 defined within, and extending through, the guide wall 210. While this is the location of the jet port 186 illustrated in the Figures, a skilled artisan will be able to select an appropriate location for the jet port 186 in a particular embodiment based on various considerations, includes the intended use of the jet level sensor, the intended arena within which the jet level sensor will be used, and the equipment and/or accessories with which the jet level sensor is intended to be used, among other considerations.

The guide wall 210 has a first end 229 that extends to a second end 230. In the jet level sensor 80 illustrated in the Figures, the first end 229 is adjacent the flow space upper end, and the second end 230 is spaced apart from the flow space lower end.

Preferably, the guide wall 210 comprises a laminar flow surface. This laminar flow surface configured for facilitating and/or inducing the Coandă Effect—the tendency of a fluid jet to be attracted to a nearby surface. The laminar flow surface of the guide wall 210 illustrated in the Figures comprises a generally curved shape between the guide wall first end 229 and the guide wall second end 230. A skilled artisan will be able to select an appropriate laminar flow surface configuration and shape for the Coandă Effect facilitating/inducing shape in a particular embodiment based on various considerations, includes the intended use of the jet level sensor, the intended arena within which the level sensor will be used, the properties and composition of the liquid, and the equipment and/or accessories with which the jet level sensor is intended to be used, among other considerations.

Figure 10:
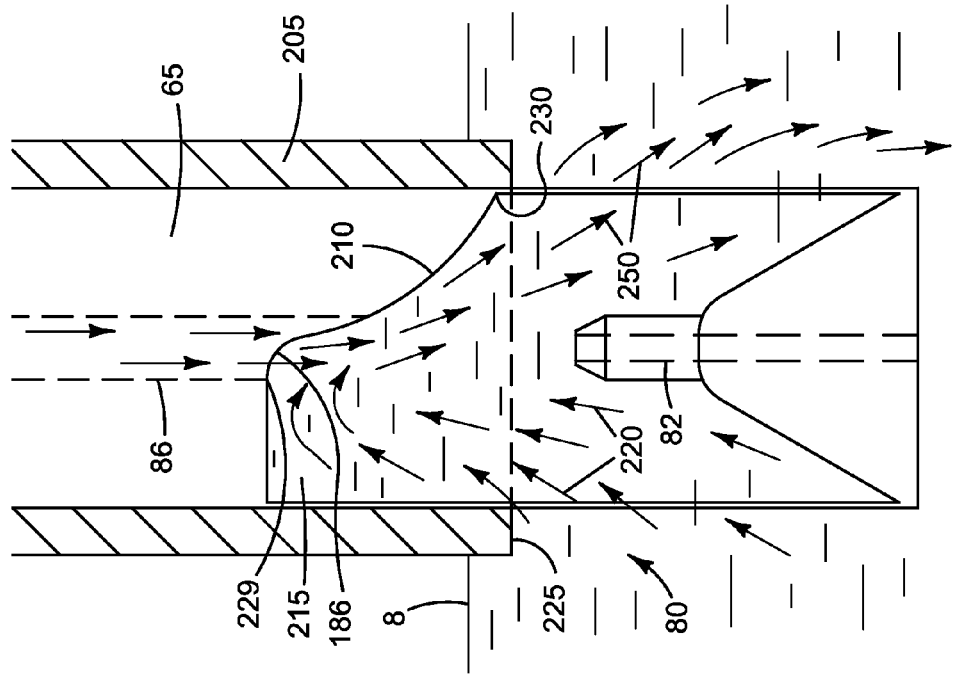
FIG. 10 is a second environmental, partial, side view of the jet level sensor of the pressure operated level sensor of FIG. 3.
Figure 9:
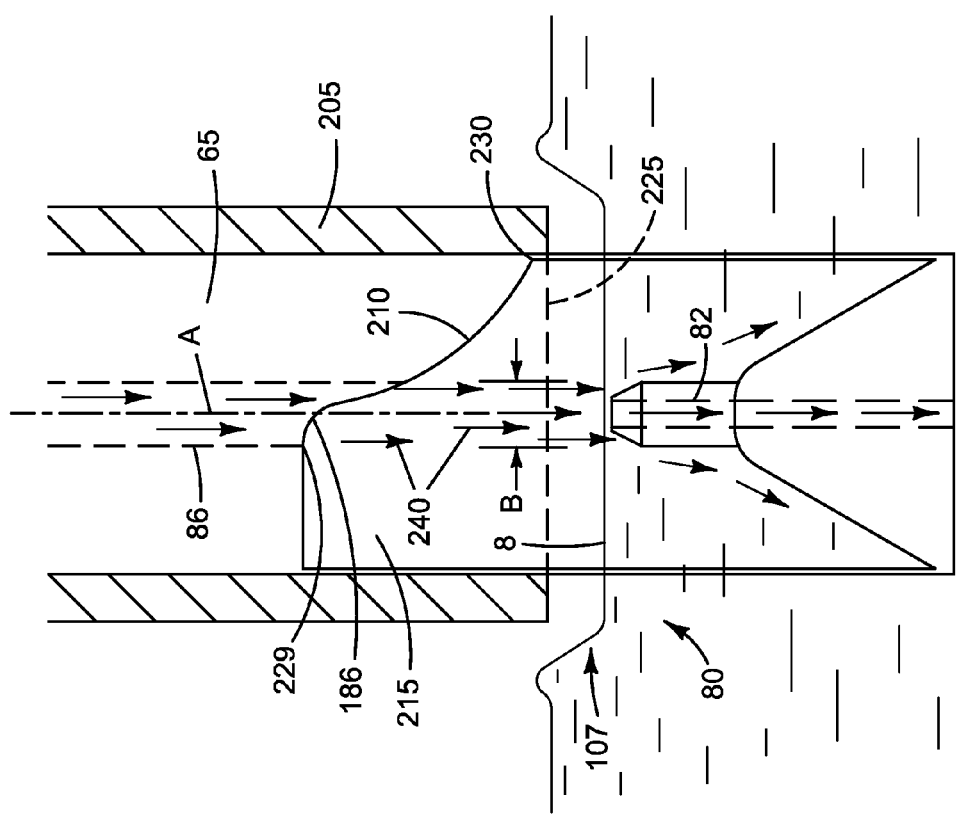
FIG. 9 is an environmental, partial, side view of a first jet level sensor of the pressure operated level sensor of FIG. 3.
Figure 11:
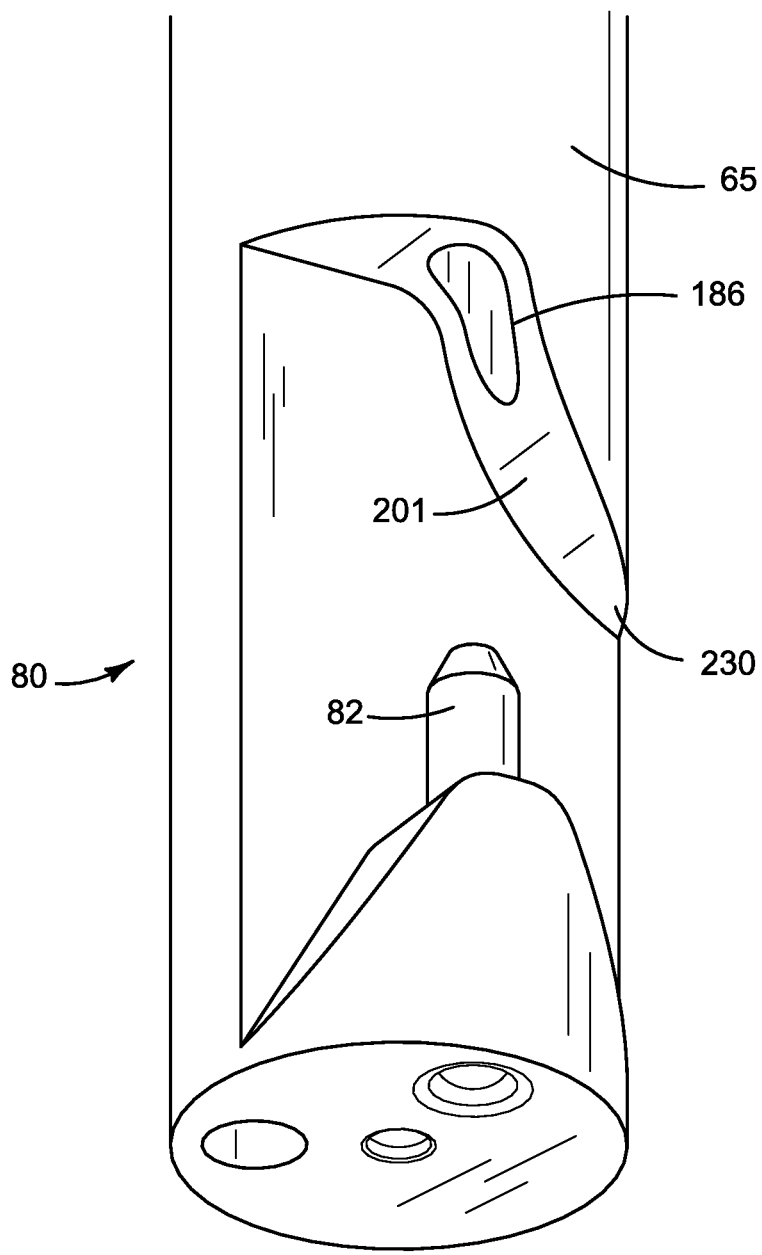
FIG. 11 is a partial, perspective view of the exemplary surge resistant jet flow sensor of FIG. 3.

As liquid is added to the container, the level 8 of the liquid in the container rises, as illustrated in FIG. 9. As illustrated in FIG. 10, when the liquid level 8 rises to cover the shroud rim 225, a disruptive stream of fluid 220 is drawn into the deflection chamber 215. The disruptive stream of fluid 220 results in the deflection of the jet flow 240 of liquid transversely of the axis of jet flow A, out of flow space B, away from the jet receiver 82, and along said guide wall 210 (utilizes the Coandă Effect), thereby removing the pressurized control.

Additionally, the utilization of such a shroud 205 results in the source of the disruptive stream of fluid 220 being spaced further from the jet nozzle 81 than shown in the prior art. This has the effect of decreasing the amount of air bubbles, in that the shroud 205 does not allow the air bubbles to enter as easily. The air bubbles must go down and around the shroud 205 to enter back into the jet stream—they have to turn 180° to do so. The end result is a vertical jet level sensor that has a predetermined shutoff level that will not hammer on and off if line pressures change.

Further, the shroud 205 is very close to the fluid well 107 (illustrated in FIG. 9) that the spray from the jet nozzle 81 tip creates in the surface 8 of the fluid. This fluid well 107 is especially pronounced at higher pressures, as much as one-half inch (12.7 mm) deeper than the rest of the fluid in the tank. The fluid well 107 is slightly below the fluid level 8, and once it comes up in contact with the shroud 205 (at the shroud rim 225), the fluid crashes into the deflection chamber 215, and immediately the fluid level is above the shroud rim 225. This makes it much harder for the disruptive stream of fluid 220 to pick up air bubbles, even if there is a surge in the jet stream pressure.

As illustrated in FIGS. 9 and 10, preferably, the guide wall 210 terminates at a second end 230 adjacent the shroud rim 225. By having the shroud rim 225 generally match up with the second end 230 of the guide wall 210, the disruptive stream of fluid 220 is drawn into the deflection chamber 215 at the shroud rim 225 on the side opposite the guide wall 210, thereby causing the deflected jet stream 250 to attach to the curved surface of the guide wall 210, disrupting the jet steam.

FIGS. 12 and 13 illustrate two alternative shroud configurations. In the exemplary jet level sensor 180 illustrated in FIG. 12, the guide wall 210 extends past the shroud rim 225 to terminate at the end 230. In the exemplary jet level sensor 280 illustrated in FIG. 13, the guide wall 210 terminates at the end 230 within the deflection chamber 215. Terminating the end 230 within the deflection chamber 215 is less preferred because it is desirable to locate the shroud rim 225 as low as possible in the fluid well 107 (illustrated in FIG. 9) that develops. This is desirable so that some of the spray from the jet nozzle 81 is directed horizontally, creating the fluid well 107 as the surrounding tank fluid level 8 moves above. The deeper the shroud rim 225 is into the fluid well 107, the higher the fluid is on the shroud 205 once it crashes into the deflection chamber 215 (or overcomes the outward jet spray). This additional fluid height from the shroud rim 225 helps to keep any spike in jet pressure from re-establishing the stream—via sucking in air (the difference in height from the bottom of this fluid well and the tank fluid level helps keep the system shut off once activated). The further the guide wall 210 extends past the shroud rim 225 to terminate at the end 230, the greater the chance that fluid will be re-directed off the guide wall 210 and into the jet receiver 82.

FIGS. 12 and 13 further illustrating the shroud 205 defining an O-ring channel for receiving an O-ring 206. The O-ring 206 for sealing the upper portion of the shroud 205 and preventing air from entering into the deflection chamber 215. Other means and manners of sealing the shroud 205 could likewise be utilized.

Figure 8:
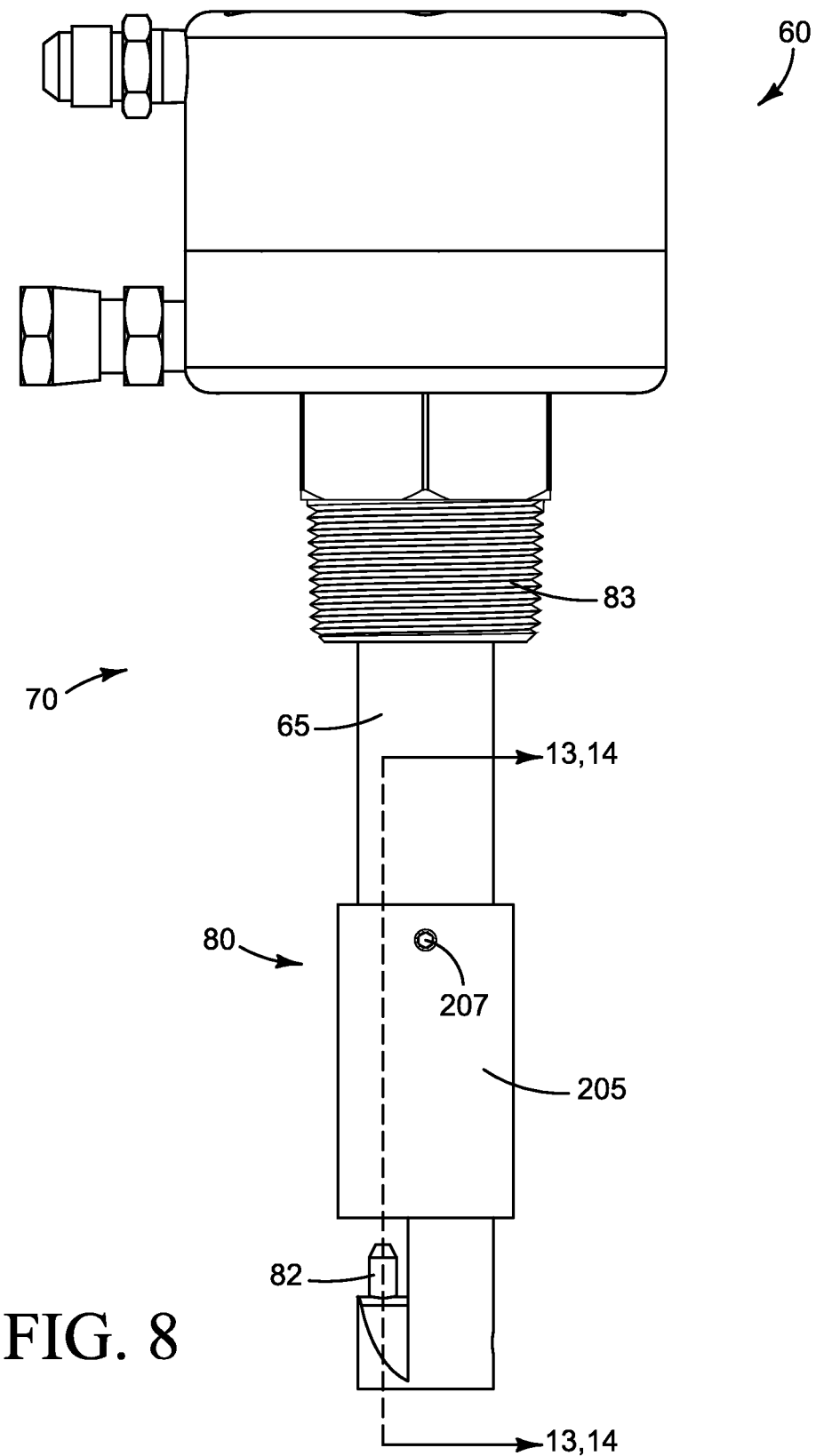
FIG. 8 is a side view of the pressure operated level sensor of FIG. 3.

FIG. 8 illustrates the shroud 205 attaching to the elongated body 65 via a set screw 207. In such a configuration, the shroud 205 can be slid onto the bottom of the elongated body 65, up to a desired position, and (via the set screw 207) fixed into place. Other means and manners of connecting the shroud 205 to the elongated body 65 could likewise be utilized. Further, the shroud could be formed as part of, or machined from the elongated body 65 itself.

As illustrated in FIG. 9, when the shroud rim 225 is unsubmerged, the jet nozzle 81 sprays a jet flow 240 of fluid into the jet receiver 82. The fluid pressure received by the jet receiver 82 is transmitted via a posterior pressure passageway 88 to a pressure chamber 91 adjacent a diaphragm valve 77. This fluid pressure great enough to unseat the valve member 62 and open the interrupt valve 74.

As illustrated in FIG. 10, when the shroud rim 225 is submerged below the fluid level 8 of the container, a disruptive stream of fluid 220 is sucked into the deflection chamber 215, creating turbulence which deflects the jet stream towards the guide wall 210. This deflected jet stream 250 following the contour of the guide wall 210, and decreasing the recovery pressure received at the jet receiver 82 from the jet nozzle 81. When the recovery pressure decreases, it is no longer able to overcome the pressure from the spring 69 biasing the valve member 62 into seating (and closing the interrupt valve 74).

Referring back to FIGS. 3 through 7, the pilot valve 60 is configured for triggering the opening and closing of the pilot-operated fluid flow control valve 20. The pilot valve 60 comprises an inlet passageway 63 fluidly connected to the bleed line 94, and an outlet 67. The inlet passageway 63 connecting with an upper chamber 76 via an inlet 68.

The inlet 68 and outlet 67 interrupted by an interrupt valve 74. The interrupt valve 74 able to move between an open position where fluid can pass from the bleed line 94 through the pilot valve 60 and out the outlet 67, and a closed position where fluid is prevented from passing through the pilot valve 60.

The pilot valve 60 fluidly connected with the posterior pressure passageway 88 and/or the pressure orifice 87. In the embodiment illustrated in the Figures, the posterior pressure passageway 88 terminates in a pressure orifice 87. The pressure orifice 87 connecting to a pressure chamber 91. The pressure chamber 91 on a first side of the interrupt valve 71. The lower chamber 78 on the second side of the interrupt valve 71.

Wherein, responsive to less than a minimum pressure in the pressure chamber 91, the interrupt valve 74 moves to its closed position. In the closed position, the pilot valve 60 is closed. When the pilot valve 60 is closed, the pressure in the second chamber 38 increases. As the pressure in the second chamber 38 increases, the piston 50 (discussed infra) moves to its first position resulting in the closing of the main fluid flow passageway 37.

Wherein responsive to at least a minimum pressure in the pressure chamber 91, the interrupt valve 74 moves to its open position. In the open position, the pilot valve 60 is open. When the pilot valve 60 is open, the pressure in the second chamber 38 decreases. As the pressure in the second chamber 38 decreases, the piston 50 moves to its second position resulting in the opening of the main fluid flow passageway 37.

In the exemplary fluid level sensor illustrated in the drawings, the interrupt valve 74 comprises a diaphragm valve assembly 170. The diaphragm valve assembly 170 positioned within a housing 72. The housing 72 connecting to a base 73. The housing 72 including a cap 75 having defined therethrough an aperture 79. A seat 66 is adjacent the aperture 79.

The diaphragm valve assembly 170 comprising a diaphragm valve 77 having an upper face and a lower face, and a centrally actuating stem 61 (actuator) extending from the diaphragm valve 77 to a valve member 62. The diaphragm valve assembly 170 preferably assembled so that the stem 61 extends through the aperture 79 so that the valve member 62 is located adjacent the seat 66. In the illustrated exemplary pilot valve 60, the diaphragm valve 77 is located external to the container 6, but internal to the pilot valve 60.

The valve member 62 is configured for sealing engagement with the seat 66, thereby interrupting the flow of fluid through the interrupt valve 74 and separating the upper chamber 76 from a lower chamber 78. The upper chamber 76 fluidly connected, via inlet 68 and inlet passageway 63 to the pressure line 96. The lower chamber 78 fluidly connected, via an outlet 64, to an outlet passageway 164 which extends to an outlet 67.

A pilot valve passageway is defined through the pilot valve 60. The pilot valve passageway extending from the inlet 68 which connects with the bleed line 94 via the inlet passageway 63, through the aperture 79, through the lower chamber 78, out the outlet 64 and into the outlet passageway 164, and out the outlet 67. As fluid exits the outlet 67, it is conveyed into the container 6. The valve member 62 interrupts the pilot valve passageway.

The diaphragm valve 77 having an open position and a closed position. In the closed position, a spring 69 biases the valve member 62 in sealing engagement with seat 66, thereby interrupting the pilot valve passageway and preventing a flow of bleed fluid from the pilot-operated fluid flow control valve 20 through the pilot valve 60.

In the open position, fluid is able to flow through the pilot valve passageway and into the container 6. When pressure in the pressure chamber 91 (from pressure orifice 87) on the lower face of the diaphragm valve 77 overcomes the spring pressure, the diaphragm valve 77 moves to its open position by pushing valve member 62 away from seat 66.

In such a configuration, the surge resistant jet level sensor 80 is installed vertically, as opposed to horizontally, so that it could be fed through a port 9 defined in the container 6.

FIG. 14 is a cross-sectional view of an exemplary pilot operated fluid flow control valve, shown in its closed position. FIG. 15 is a cross-sectional view of the exemplary pilot operated fluid flow control valve illustrated in FIG. 14, shown in its open position. An exemplary refilling apparatus could comprise a pilot-operated fluid flow control valve 20 (as shown in FIGS. 14 and 15) and a fluid level sensor, such as the fluid level sensor 70 illustrated in FIGS. 2 and 3.

FIGS. 14 and 15 illustrate an exemplary pilot operated fluid flow control valve 20. This exemplary control valve 20 comprising a fluid source connector 32 (e.g., dry disconnect receptacle), a poppet valve assembly 33, a valve body portion 40 comprising an upper portion 39 and a lower portion 41, and a piston 50.

The fluid source connector 32 of the fluid flow control valve 20 configured for connecting with a fluid source. Any suitable structure can be used for the connection, and a skilled artisan will be able to select an appropriate structure for the connection in a particular embodiment based on various considerations, including the intended use of the fluid flow control valve 20, the intended environment within which the fluid flow control valve 20 will be used, and the equipment and/or accessories with which the fluid flow control valve 20 is intended to be used, among other considerations.

In the exemplary fluid flow control valve 20 illustrated in FIGS. 2, 14 and 15, the fluid source connector 32 comprises a dry disconnect receptacle for connecting with dry disconnect coupler (not illustrated) connected to the fluid source (not illustrated), such as a Whitaker dry disconnect coupling. The dry disconnect receptacle configured for mating with the dry disconnect coupler (not illustrated). A single point dry break coupler is preferred, with API style dry break couplers likewise being useful. The dry disconnect coupling allowing a fluid conduit (not illustrated) connected to the fluid source (not illustrated) to be fluidly connected with the fluid flow control valve 20. The utilization of a dry disconnect coupling is well known in the prior art, for instance as shown in U.S. Pat. No. 6,155,294 to Cornford.

In operation of this exemplary fluid flow control valve 20, upon connecting the coupler to the fluid source connector 32, a lever (not illustrated) is engaged which causes a poppet valve in the coupler to force open the poppet valve assembly 33 of the receptacle (or vice versa), thereby allowing fluid to be transmitted from the fluid conduit, through the dry disconnect coupling and into the main fluid flow passageway of the fluid flow control valve 20. Upon disengagement of the lever, the poppet valve of the coupler moves away from the poppet valve assembly 33 of the fluid source connector 32 (or vice versa), allowing the receptacle's poppet valve assembly 33 to close, thereby preventing spillage of fluid out of the receptacle after filling is complete (at disconnect).

As illustrated in FIGS. 14 and 15, the fluid source connector 32 of the fluid flow control valve 20 fluidly connects the valve body portion 40 at an inlet orifice 34. The illustrated fluid source connector 32 being a dry disconnect receptacle.

The valve body portion 40 comprises an upper portion 39 and a lower portion 41. In the exemplary fluid flow control valve 20 illustrated in the Figures, the fluid source connector 32 connects to the upper portion 39 of the valve body portion 40. The opposite end of the upper portion 39 comprising an outlet orifice 35 defining a seat 42. The seat 42 configured for mating engagement with a beveled face 55 of the head of a piston 50. A first chamber 36 defined within the upper portion 39 between the inlet orifice 34 and the outlet orifice 35.

In the exemplary fluid flow control valve 20 illustrated in the Figures, the valve body portion 40 comprises external threads configured for threading into a threaded hole within a wall of the container (preferably the top wall of the container, or, as illustrated in FIG. 2, into a threaded receiver 7 having a port 5 extending from the container 6). The threaded receiver 7 can comprise a pre-existing port into the container, such as a refilling port, or the port can be created for the purpose of utilization of an exemplary system/method. Other manners of mounting the fluid flow control valve 20 to the container 6 are likewise possible. Any suitable connection means can be used for the connection, and a skilled artisan will be able to select an appropriate structure for the connection in a particular embodiment based on various considerations, including the intended use of the fluid flow control valve, the intended environment within which the fluid flow control valve will be used, and the equipment and/or accessories with which the fluid flow control valve is intended to be used, among other considerations.

In one particular application, a locomotive's fuel tank (container) will has a one-half inch (½) to three-quarter inch (¾") National Pipe Thread (NPT) port 5 through the top wall of the container 6, extending from the outside of the container to the inside of the container. In some exemplary systems/methods, the port 5 is defined at a distal end of a threaded receiver 7. This 5 port is typically used as a vent tube and/or to connect the locomotive's fuel tank to the existing receiver using a flexible tube. The port 5 of the threaded receiver being internally threaded and configured for receiving the threaded portion of the valve body portion 40.

It is preferred that the container 6 comprise a second port 9 defined through the container 6, extending from the outside of the container to the inside of the container. The second port 9 for allowing the surge resistant jet level sensor 80 to be inserted there-through and into the container. The second port 9 preferably comprising threading configured for receiving a threaded portion 83 of the fluid level sensor 70 there-through. It is preferred that the port 9 be located on a top side of the container 6, thereby enabling the surge resistant jet level sensor 80 to be installed generally vertically into the container 6. The second port 9 may likewise comprise a National Pipe Thread (NPT) port through the top wall of the container 6.

The fluid flow control valve 20 comprising an axial pressure port 25 fluidly connected to the first chamber 36. The axial pressure port 25 receiving an axial pressure port fitting 97 which, via a pressure line 96, fluidly connects the first chamber 36 to the fluid level sensor 70 at a distal pressure port 58 via a distal pressure port fitting 98.

The fluid flow control valve 20 comprising an axial bleed port 45 fluidly connected to the second chamber 38 via a bleed line 44. The bleed line 44 fluidly connecting the second chamber 38 to the fluid level sensor 70. The axial bleed port 45 receiving an axial bleed port fitting 93 which, via a bleed line 94, fluidly connects to the fluid level sensor 70 at a distal bleed port 57 via a distal bleed port fitting 95.

Any suitable passageway can be used for the bleed line 94 and/or the pressure line 96, and a skilled artisan will be able to select an appropriate passageway (e.g., conduit, tubing, hose) for the connection in a particular embodiment based on various considerations, including the intended use of the fluid flow control valve, the intended environment within which the system 10 will be used, and the equipment and/or accessories with which the fluid flow control valve is intended to be used, among other considerations.

The lower portion 41 having a housing 46. The housing 46 having an internal sidewall 47, and an end wall 49 which define an open topped cylinder in which at least a portion of a piston 50 is slidably received. The cylinder extending between a seat end and a dome end, and defined between a sidewall 47 and an end wall 49.

The piston 50 reciprocable axially of the seat 66 within the cylinder. The piston 50 having head 51 and an underside 53. The head 51 having a sealing face 55. The piston 50 movable in-between a first position where the sealing face 55 engages the valve seat 66 thereby closing the main fluid flow passageway 37, and a second position where the sealing face 55 is not engaged with the valve seat 66 and wherein the main fluid flow passageway 37 is open.

The second chamber 38 ("dome") defined between the underside 53 of the piston 50, the sidewall 47 and the end wall 49. The second chamber 38 adjacent the dome end. A lower port 43 fluidly connects the second chamber 38 with the bleed passage 44.

A vent passageway 54 connects the main fluid flow passageway 37 with the second chamber 38. The vent passageway 54 can be defined through the head 51, or through an insert 52 extending through a port in the head 51.

The fluid flow control valve 20 having a valve body portion 40. The fluid flow control valve 20 defining a main fluid flow passageway 37 extending through the valve body portion 40. The main fluid flow passageway 37 extending between an inlet orifice 34 and an outlet orifice 35.

A valve seat 66 is defined in the main fluid flow passageway 37 between the inlet orifice 34 and a fluid flow passage 48. The fluid flow passage 48 for allowing fluid passing through the fluid flow control valve 20 to be conveyed into the container 6. The fluid flow passage 48 can be best be seen in FIG. 15 as being open, and in FIG. 14 as being closed (the head 51 of the piston 50 almost sealing against the seat 42 (sealing would effectively close the lateral fluid flow passage 48)).

The piston 50 having a head 51. In the exemplary fluid flow control valve 20 illustrated in the Figures, the head 51 having a beveled face 55. In other exemplary fluid flow control valves, the face may be planar, curved, or another shape. The beveled face 55 configured for creating a mating seal against the seat 42.

The piston 50 sealing against the seat 42 serving as a shutoff valve within the fluid flow control valve 20. This shutoff valve interrupting the main fluid flow passageway 37 which extends from the orifice 34, through the first chamber 36, out the outlet orifice 35, out the lateral fluid flow passage 48 and into the container 6.

FIG. 14 illustrates the piston 50 in its closed position. When the piston 50 is in its closed position and the fluid level sensor is in its closed position, the piston 50 remains in its closed position.

When the piston 50 is in its closed position and the fluid level sensor is in its open position, the piston 50 remains in its closed position until/unless a flow of fluid from the fluid conduit, through the dry disconnect receptacle (fluid source connector) 32 and into the fluid flow control valve 20 is present. If such a flow of fluid is present, the pressure (Pb) in the second chamber 38 is lower than the pressure (Pa) above the head of the piston 50, resulting in the piston 50 moving from its first (closed) position) to its second (open) position, opening the fluid flow control valve 20 and permitting a flow of fluid from the fluid source, through the fluid flow control valve 20, and into the container 6.

FIG. 15 illustrates the piston 50 in its open position. When the piston 50 is in its open position and the fluid level sensor 70 is in its open position, the pressure (Pb) in the second chamber 38 is lower than the pressure (Pa) above the head of the piston 50, resulting in the piston moving from its first (closed) position to its second (open) position (or remaining in its second (open) position if it is already in that position).

When the piston 50 is in its open position (FIG. 15), and the fluid level sensor 70 transitions from the open position (illustrated in FIGS. 5 and 6) to its closed position (illustrated in FIG. 7), static pressure builds in the bleed passage(s), and the fluid pressure (Pb) builds in the second chamber 38, causing the piston 50 to overcome the dynamic pressure (from the flow of fluid from the fluid source through the valve) and begin to move towards the seat 42 of the first chamber 36. The fluid flow around the top of the piston 50 is dynamic (low), whereas the fluid pressure beneath the piston (in the second chamber 38) is static (high), resulting in the pressure (Pb) beneath the piston 50 being greater than the pressure (Pa) above the piston 50, causing piston movement from the open position to the closed position. As the face 55 of the piston 50 comes into contact with the seat 42 of the outlet orifice 35, the piston 50 moves into its closed position whereby the outlet orifice 35 is closed.

When the piston 50 moves to the closed position, there is no flow around the top of the piston 50 any longer. This results in the fluid pressure (Pa) above the piston 50, and the fluid pressure (Pb) beneath the piston (in the second chamber 38) being generally the same. While the fluid pressures (Pa, Pb) are generally the same, the lower cross-sectional area (Ab) of the cylinder is greater than the upper cross-sectional area (Aa) of the outlet orifice 35. The net force (F) caused by the lower cross-sectional area (Ab) being more effective than the upper cross-sectional area (Aa) keeps the piston 50 in its closed position, sealing the outlet orifice 35 (as illustrated in FIG. 14). Because of this difference in area and pressure, no spring is needed for biasing the piston's beveled head against the seat of. Alternatively, a spring could be utilized.

In the exemplary refilling system 10 illustrated in FIG. 2, a bleed line 94 interconnects the fluid flow control valve 20 to the fluid level sensor 70. The fluid level sensor 70 comprising means for determining the fluid level in the container. The fluid level sensor 70 sensing the fluid level to determine, based upon desired fluid levels, if the fluid is high (no fluid should be added to the container), or if the fluid is low (fluid should be added to the container).

When the fluid is determined to be low (below a predetermined level), the fluid level sensor 70 configured to allow bleed fluid to pass from the fluid flow control valve 20 through the bleed passage 44, through the bleed line 94, through the fluid level sensor 70, and into the container 6.

When the fluid level is determined to be high (above or equal to a predetermined level), the fluid level sensor 70 configured to prevent bleed fluid from passing through the fluid level sensor 70 and into the container 6. Once the bleed passage has been blocked (by the fluid level sensor 70), the area above the piston 50 (the first chamber 36) has high fluid velocity (low pressure) and the area below the piston 50 (the second chamber 38) has low fluid velocity (high pressure). The effective area of the outlet orifice 35 is smaller than the effective area of the piston 50. The net force (pressure multiplied by area) on the piston 50 thus moves the piston 50 upwards into sealing engagement with the seat 42, closing the outlet orifice 35, and shutting off the flow of fluid through the fluid flow control valve 20.

During no-flow conditions or when the system 10 has shut down, the piston 50 is engaged with the seat 42. The pressures are equal on each side of the piston 50, as both fluid flows are zero. In order for the piston 50 to still remain sealed, the piston 50 area must be greater than the area of the outlet orifice 35. The result is that a spring is not necessary for biasing the piston's beveled face 55 against the seat 42 of the upper portion 39.

FIGS. 16 and 17 illustrate cross-sectional views of an exemplary pilot operated fluid flow control valve of a sixth exemplary refilling system, shown in its closed position (FIG. 16) and its open position (FIG. 17). The exemplary receiver 320 of FIGS. 16 and 17 is generally similar to the receiver 20 of FIGS. 14 and 15, except as explained in the following paragraphs.

A bleed passage 144 is defined through the upper portion 39, extending from the inlet port 45 to the bleed passage 44 defined through the lower portion 41. The bleed passage 144 is configured to fluidly connect with a second bleed passage 44 defined through the lower portion 41, thereby defining at least one joint bleed passage. Preferably, an O-ring or other seal is used at such a connection for preventing leakage, such as a bleed passage O-ring 37. The second bleed passage 44 extending between a first end configured for fluid connection with the first bleed passage 144, and a second end configured for fluid connection with a second chamber 38.

The piston 50 illustrated in FIGS. 16 and 17 does not comprise a vent passageway like the vent passageway 54 in FIGS. 14 and 15. The bleed passage 144 further comprising an upper bleed port passageway 189 fluidly connected to the first chamber 36 at an upper bleed port 190. The upper bleed port passageway 189 allowing fluid to flow from the first chamber 36 and into the bleed passage 144. The upper bleed port passageway 189 fluidly connecting the first chamber 36 to the second chamber 38 via bleed passage 144 and bleed passage 44. It is preferred that the upper bleed port passageway 189 face into the flow of fluid from the fluid source through the first chamber 36, out the lateral fluid flow passage 61 and into the container 6. In some exemplary fluid flow control valves, the upper bleed port passageway 189 comprises a screen 192 for preventing foreign objects from passing into (and potentially plugging) upper bleed port passageway 189 and/or the bleed passage 144. In some exemplary fluid flow control valves, the upper bleed port passageway 189, comprises a piston jet insert 191 received into the upper bleed port passageway 189 through the upper bleed port 190 or otherwise fluidly connected thereto. The piston jet insert 191 for effectively allowing the diameter of the upper bleed port 190 to be modified for testing purposes. Alternatively, no piston jet insert 191 could be included, and desired flow could be created based upon the diameter of the upper bleed port 190 and/or upper bleed port passageway 189.

In FIGS. 16 and 17, the inlet port 45 extends through the upper portion 39. In other embodiments, the inlet port could extend through the lower portion, or other structure. This inlet port 45 configured for fluidly connecting, such as via the bleed line 94 illustrated in FIG. 2, to the fluid level sensor 70.

The piston 50 having an underside 53 and an external sidewall 56 having at least one annular sidewall groove 157 configured for receiving at least one sealing member 52 therein. The sealing member(s) 52 (e.g., O-rings, Teflon seals) sealing the piston external sidewall 56 to the housing internal sidewall 47. In other exemplary fluid flow control valves, such an annular groove/sealing member may not be present. In the exemplary fluid flow control valve 20 illustrated in FIGS. 2 through 7, the sealing face 55 comprising an annular groove 48 for receiving therein a sealing member 77 therein. The sealing member 77 (e.g., O-rings, Teflon seals) for assisting in the creation of the mating seal against the seat 42. In other exemplary fluid flow control valves, such an annular groove/sealing member may not be present.

The valve body portion 40 comprises external threads 81 configured for threading into a threaded hole within a wall of the container (preferably the top wall of the container, or, as illustrated in FIG. 2, into a threaded receiver 7 having a port 5 extending from the container 6).

In another exemplary refilling system, the refilling system comprises a refueling system for large equipment (e.g., a locomotive), where the container comprises a fuel tank and the fluid comprises fuel.

One benefit to such a configuration is that the system is configured for "failing closed," meaning that should any of the components fail, the fluid level sensor will trigger the closure of the pilot-operated fluid flow control valve, thereby preventing the over filling of the container, thereby decreasing the chances that the fluid will be spilled out of the container into the environment.

Any suitable structure and/or material can be used for the components of the refueling system, and a skilled artisan will be able to select an appropriate structure and material for the components in a particular embodiment based on various considerations, including the intended use of the refueling system, the intended arena within which the refueling system will be used, and the equipment and/or accessories with which the refueling system is intended to be used, among other considerations.

Any suitable structure and/or material can be used for the components of the fluid flow control valve, and a skilled artisan will be able to select an appropriate structure and material for the components of the fluid flow control valve in a particular embodiment based on various considerations, including the intended use of the fluid flow control valve, the intended arena within which the fluid flow control valve will be used, and the equipment and/or accessories with which the fluid flow control valve is intended to be used, among other considerations. The inventor has determined that metals and plastics are considered suitable for use in the various components of the fluid flow control valve.

One exemplary method is a method of preparing a container for refilling with a fluid from a fluid source. The container having a first port and a second port. The refilling system comprising the steps of: installing a pilot-operated fluid flow control valve through the first port, the pilot-operated fluid flow control valve comprising a housing having a main fluid flow passageway extending from an inlet orifice to an outlet orifice, a valve closure element interrupting the main fluid flow passageway at a seat, a first chamber defined between the inlet orifice and the seat, the first chamber on a first side of the valve closure element, a second chamber defined on a second side of the valve closure element, the valve closure element able to move from a first position where the main fluid flow passageway is interrupted to a second position where the main fluid flow passageway is not interrupted; installing a pilot valve, the pilot valve having a passageway there-through interrupted by an interrupt valve, the passageway comprising an inlet and an outlet; installing a pressure operated level sensor through the second port and into the container, the pressure operated level sensor comprising a jet level sensor having a jet and a receiver; installing a pressure line fluidly connecting the first chamber with the pressure operated level sensor passageway inlet; installing a bleed line fluidly connecting the second chamber with the pilot valve inlet; and installing a posterior pressure passageway fluidly connecting the pressure operated level sensor receiver to the pilot valve.

It is noted that all structure and features of the various described and illustrated embodiments can be combined in any suitable configuration for inclusion in a fluid flow control valve according to a particular embodiment. For example, a fluid flow control valve according a particular embodiment can include or not include a filter, and/or a fluid flow control valve according a particular embodiment can include or not include a spring.

Any suitable materials can be used to form the various components of the fluid flow control valve, and a skilled artisan will be able to select appropriate materials for the various components of a fluid flow control valve according to a particular embodiment based on various considerations, including the fluid with which the fluid flow control valve is intended to be used, and the environment within which the fluid flow control valve is intended to be used. The inventor has determined that conventional polymeric and metal materials are suitable for use in the various components of the fluid flow control valve. For example, the fluid flow control valve and associated components can be injection-molded from suitable plastics known in the art. Alternatively, the fluid flow control valve and associated components can be formed from metal materials, including stainless steel and other suitable metals. Alternatively, some of the fluid flow control valve and associated components can be injection-molded from suitable plastics known in the art, whereas other of the fluid flow control valve and associated components can be formed from metal materials, including stainless steel and other suitable metals. Materials hereinafter discovered and/or developed that are determined to be suitable for use in fluid flow control valve devices would also be considered suitable for use in a fluid flow control valve according to a particular embodiment.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

What is claimed is:

1. A refilling system for use in refilling a container with a fluid from a fluid source, said container having an air space above a fluid space, said fluid having a fluid level within said container, said refilling system comprising: a pilot-operated fluid flow control valve fluidly connected with a fluid level sensor via a pressure line and a bleed line, wherein:

said pilot operated fluid flow control valve comprising a housing, a main fluid flow passageway extending through said housing, a valve closure element interrupting said main fluid flow passageway and able to move from a first position where said main fluid flow passageway is interrupted to a second position where said main fluid flow passageway is not interrupted;

said pressure line in fluid communication with said control valve, said pressure line fluidly connecting with said fluid level sensor;

said bleed line in fluid communication with said control valve, said bleed line fluidly connecting with said fluid level sensor; and said fluid level sensor comprising a pressure operated level sensor and a pilot valve, said pressure operated level sensor fluidly connecting with said pressure line, said pressure line transmitting pressure from said control valve to said fluid level sensor, said pressure operated level sensor sensing the level of fluid in said container, wherein if the level of fluid sensed is below a predetermined level the pressure operated level sensor outputs a minimum pressure through a posterior pressure passageway to said pilot valve, wherein if the level of fluid sensed is equal to or above a predetermined level the pressure operated level sensor outputs less than a minimum pressure through a posterior pressure passageway to said pilot valve, and said pilot valve comprising an inlet fluidly connected to said bleed line, an outlet, and an interrupt valve able to move between an open position where fluid can pass from said bleed line through said pilot valve, and a closed position where said fluid is prevented from passing through said pilot valve, said pilot valve fluidly connected with said posterior pressure passageway, wherein responsive to less than a minimum pressure from said posterior pressure passageway said interrupt valve moves to its closed position, and wherein responsive to at least a minimum pressure from said posterior pressure passageway said interrupt valve moves to its open position, wherein when said pilot valve is closed, the valve closure element of the control valve moves to its first position, and wherein when said pilot valve is open, the valve closure element of the control valve is able to move to its second position.

2. The refilling system of claim 1, wherein said pressure operated level sensor comprises a jet level sensor.

3. A refilling system for use in refilling a container with a fluid from a fluid source, said container having an air space above a fluid space, said fluid having a fluid level within said container, said refilling system comprising: a pilot-operated fluid flow control valve fluidly connected with a fluid level sensor via a pressure line and a bleed line, wherein:

said pilot operated fluid flow control valve comprising a housing, a main fluid flow passageway extending through said housing, said main fluid flow passageway extending between an inlet orifice and an outlet orifice, a valve seat in said main fluid flow passageway, a first chamber defined between said inlet orifice and said outlet orifice, a piston reciprocable axially of said seat within a cylinder, said cylinder extending between a seat end and a dome end, said piston having a sealing face, said piston movable in-between a first position where said sealing face engages said valve seat thereby closing said main fluid flow passageway and a second position where said sealing face is not engaged with said valve seat and wherein said main fluid flow passageway is open, a second chamber adjacent said dome end, a vent passageway connecting said main fluid flow passageway with said second chamber, said second chamber fluidly connecting via said bleed line to said fluid level sensor;

said pressure line in fluid communication with said first chamber, said pressure line fluidly connecting with said fluid level sensor;

said bleed line in fluid communication with said second chamber, said bleed line fluidly connecting with said fluid level sensor; and said fluid level sensor comprising a pressure operated level sensor and a pilot valve, said pressure operated level sensor fluidly connecting with said pressure line, said pressure line transmitting pressure from said first chamber to said fluid level sensor, said pressure operated level sensor sensing the level of fluid in said container, wherein if the level of fluid sensed is below a predetermined level the pressure operated level sensor outputs a minimum pressure through a posterior pressure passageway to said pilot valve, wherein if the level of fluid sensed is equal to or above a predetermined level the pressure operated level sensor outputs less than a minimum pressure through a posterior pressure passageway to said pilot valve, and said pilot valve comprising an inlet fluidly connected to said bleed line, an outlet, and an interrupt valve able to move between an open position where fluid can pass from said bleed line through said pilot valve, and a closed position where said fluid is prevented from passing through said pilot valve, said pilot valve fluidly connected with said posterior pressure passageway, wherein responsive to less than a minimum pressure from said posterior pressure passageway said interrupt valve moves to its closed position, and wherein responsive to at least a minimum pressure from said posterior pressure passageway said interrupt valve moves to its open position, wherein when said pilot valve is closed, the pressure in the second chamber increases and the piston moves to its first position closing said main fluid flow passageway, and wherein when said pilot valve is open, the pressure in the second chamber decreases and the piston moves to its second position opening said main fluid flow passageway.

4. The refilling system of claim 3, wherein said inlet orifice comprises a dry disconnect receptacle.

5. The refilling system of claim 3, wherein said vent passageway comprises a port through said piston.

6. The refilling system of claim 3, wherein said pressure line fluidly connects an axial pressure port defined through said pilot-operated fluid flow control valve housing with a distal pressure port defined through said fluid level sensor housing.

7. The refilling system of claim 6, wherein said distal pressure port is in fluid communication with an anterior pressure passageway.

8. The refilling system of claim 3, wherein said bleed line fluidly connects an axial bleed port defined through said pilot-operated fluid flow control valve housing with a distal bleed port defined in said fluid level sensor housing.

9. The refilling system of claim 8, wherein said distal bleed port is in fluid communication with an inlet passageway.

10. The refilling system of claim 8, wherein said axial bleed port fluidly connects with a bleed line connecting with said second chamber.

11. The refilling system of claim 3, wherein said pressure operated level sensor comprises a jet level sensor.

12. The refilling system of claim 11, wherein said jet level sensor comprises a jet nozzle spaced apart from a jet receiver, said jet receiver aligned with said jet nozzle so as to provide an output liquid pressure signal through a posterior pressure passageway to a pressure orifice.

13. The refilling system of claim 12, wherein said pressure line fluidly connects an axial pressure port defined through said pilot-operated fluid flow control valve housing and a distal pressure port defined in said fluid level sensor housing, wherein said distal pressure port is in fluid communication with an anterior pressure passageway which provides pressure to the jet nozzle.

14. The refilling system of claim 3, wherein said pilot valve comprises a diaphragm valve assembly.

15. The refilling system of claim 14, wherein said diaphragm valve assembly comprises a diaphragm valve having an underside, a stem extending from the diaphragm valve to a valve member, the valve member configured for sealing engagement of a seat, pilot valve passageway through said pilot valve, from an inlet passageway which connects with the bleed line through the seat out to an outlet passageway, valve member interrupts the bleed line, spring holds valve member in sealing engagement with seat, pressure above minimum from pressure orifice on the underside of the diaphragm overcomes spring pressure and opens diaphragm valve by pushing valve member away from seat.

16. The refilling system of claim 3, wherein said container has a top surface, wherein said fluid level sensor is mounted on the top surface of the container, and wherein said fluid level sensor extends downwards into the container.

17. A refilling system for use in refilling a container with a fluid from a fluid source, said container having an air space above a fluid space, said fluid having a fluid level within said container, said refilling system comprising: a pilot-operated fluid flow control valve fluidly connected with a fluid level sensor via a pressure line and a bleed line, wherein:

said pilot operated fluid flow control valve comprising a housing, a main fluid flow passageway extending through said housing, said main fluid flow passageway extending between an inlet orifice and an outlet orifice, a valve seat in said main fluid flow passageway, a first chamber defined between said inlet orifice and said outlet orifice, a piston reciprocable axially of said seat within a cylinder, said cylinder extending between a seat end and a dome end, said piston having a sealing face, said piston movable in-between a first position where said sealing face engages said valve seat thereby closing said main fluid flow passageway and a second position where said sealing face is not engaged with said valve seat and wherein said main fluid flow passageway is open, a second chamber adjacent said dome end, a vent passageway connecting said main fluid flow passageway with said second chamber, said second chamber fluidly connecting via said bleed line to said fluid level sensor;

said pressure line in fluid communication with said first chamber, said pressure line fluidly connecting with said fluid level sensor, said pressure line fluidly connecting an axial pressure port defined through said pilot-operated fluid flow control valve housing with a distal pressure port defined through said fluid level sensor housing;

said bleed line in fluid communication with said second chamber, said bleed line fluidly connecting with said fluid level sensor, said bleed line fluidly connecting an axial bleed port defined through said pilot-operated fluid flow control valve housing with a distal bleed port defined in said fluid level sensor housing; and said fluid level sensor comprising a jet level sensor and a pilot valve, said jet level sensor fluidly connecting with said pressure line, said pressure line transmitting pressure from said first chamber to said fluid level sensor, said jet level sensor sensing the level of fluid in said container, said jet level sensor comprising a jet port defined in a jet level sensor body, a jet receiver, a guide wall, and a shroud, wherein: said jet port for directing a jet flow of liquid along a predetermined axis of jet flow, a flow space defined along said axis of jet flow, said flow space having an upper end adjacent said jet port, and a lower end adjacent said jet receiver, said jet receiver located below said jet port, and spaced apart there-from, said jet receiver aligned with the axis of jet flow and configured for receiving said jet flow from said jet port to maintain a pressurized control, said guide wall having a first end adjacent said flow space upper end, and a second end spaced apart from said flow space lower end, said shroud having at least one internal wall, said shroud extending downwards from said jet level sensor body, away from said jet port, and towards said jet receiver, said shroud terminating above said jet receiver at a shroud rim, said shroud defining an open ended deflection chamber between said body, said internal wall, said guide wall, and said shroud rim, said flow space extending through said deflection chamber, wherein as liquid is added to said container, said level rises, said jet level sensor for providing an output liquid pressure signal through a posterior pressure passageway to a pressure orifice, wherein if the level of fluid sensed is below a predetermined level the jet level sensor outputs a minimum pressure through said posterior pressure passageway, wherein when said liquid level rises to cover said shroud rim, liquid is drawn into said deflection chamber, deflecting said jet flow of liquid transversely of the axis of jet flow, away from said jet receiver, and along said guide wall, the jet level sensor outputs less than a minimum pressure through said posterior pressure passageway thereby removing the pressurized control; and said pilot valve comprising an inlet fluidly connected to said bleed line, an outlet, and an interrupt valve able to move between an open position where fluid can pass from said bleed line through said pilot valve, and a closed position where said fluid is prevented from passing through said pilot valve, said pilot valve fluidly connected with said posterior pressure passageway, wherein responsive to less than a minimum pressure from said posterior pressure passageway said interrupt valve moves to its closed position, and wherein responsive to at least a minimum pressure from said posterior pressure passageway said interrupt valve moves to its open position, wherein when said pilot valve is closed, the pressure in the second chamber increases and the piston moves to its first position closing said main fluid flow passageway, and wherein when said pilot valve is open, the pressure in the second chamber decreases and the piston moves to its second position opening said main fluid flow passageway.

18. The refilling system of claim 17, wherein said pressure line fluidly connects an axial pressure port defined through said pilot-operated fluid flow control valve housing and a distal pressure port defined in said fluid level sensor housing, wherein said distal pressure port is in fluid communication with an anterior pressure passageway which provides pressure to the jet nozzle.

19. The refilling system of claim 17, wherein said pilot valve comprises a diaphragm valve assembly.

20. The refilling system of claim 19, wherein said diaphragm valve assembly comprises a diaphragm valve having an underside, a stem extending from the diaphragm valve to a valve member, the valve member configured for sealing engagement of a seat, pilot valve passageway through said pilot valve, from an inlet passageway which connects with the bleed line through the seat out to an outlet passageway, valve member interrupts the bleed line, spring holds valve member in sealing engagement with seat, pressure above minimum from pressure orifice on the underside of the diaphragm overcomes spring pressure and opens diaphragm valve by pushing valve member away from seat.

* * * * *